(12) United States Patent
Gozu et al.

(10) Patent No.: US 12,552,101 B2
(45) Date of Patent: Feb. 17, 2026

(54) THREE-DIMENSIONAL SHAPING DEVICE AND METHOD OF MANUFACTURING THREE-DIMENSIONAL SHAPED OBJECT

(71) Applicant: SEIKO EPSON CORPORATION, Tokyo (JP)

(72) Inventors: Masayuki Gozu, Ina (JP); Taki Hashimoto, Shiojiri (JP); Kazuhide Nakamura, Asahi-mura (JP)

(73) Assignee: Seiko Epson Corporation, Tokyo (JP)

( * ) Notice: Subject to any disclaimer, the term of this patent is extended or adjusted under 35 U.S.C. 154(b) by 301 days.

(21) Appl. No.: 18/495,133

(22) Filed: Oct. 26, 2023

(65) Prior Publication Data
US 2024/0140032 A1   May 2, 2024

(30) Foreign Application Priority Data

Oct. 28, 2022   (JP) .................... 2022-173094

(51) Int. Cl.
| | |
|---|---|
| *B29C 64/295* | (2017.01) |
| *B29C 64/393* | (2017.01) |
| *B33Y 30/00* | (2015.01) |
| *B33Y 50/02* | (2015.01) |

(52) U.S. Cl.
CPC .......... *B29C 64/295* (2017.08); *B29C 64/393* (2017.08); *B33Y 30/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 11,884,013 B2 * | 1/2024 | Abe | ................. B29C 64/295 |
| 2017/0157845 A1 | 6/2017 | Bihari | |
| 2018/0200955 A1 * | 7/2018 | Hoelldorfer | ........... B33Y 30/00 |

FOREIGN PATENT DOCUMENTS

JP    2017-523063 A    8/2017

* cited by examiner

*Primary Examiner* — Yung-Sheng M Tsui
*Assistant Examiner* — Melody Tsui
(74) *Attorney, Agent, or Firm* — WORKMAN NYDEGGER

(57) ABSTRACT

A three-dimensional shaping device includes a plasticizing unit configured to plasticize a material to generate a plasticized material, a nozzle configured to discharge the plasticized material, a stage including a shaping surface on which the plasticized material is stacked, a moving unit configured to change relative positions of the nozzle and the stage, a plate-shaped first heating unit including a heater configured to heat the plasticized material on the stage, a through-hole being formed in the first heating unit, and a first supporting unit configured such that a relative position thereof to the stage changes together with the nozzle, the first supporting unit supporting the first heating unit to thereby dispose the first heating unit in a position opposed to the stage. At a shaping time, at least a part of the nozzle is located in the through-hole. The first supporting unit includes a posture changing unit configured to allow a change in a posture of the first heating unit. The posture changing unit is configured to be capable of fixing the posture in a state in which a heating surface and the shaping surface are in contact in parallel.

9 Claims, 12 Drawing Sheets

THREE-DIMENSIONAL SHAPING DEVICE AND METHOD OF MANUFACTURING THREE-DIMENSIONAL SHAPED OBJECT

The present application is based on, and claims priority from JP Application Serial Number 2022-173094, filed Oct. 28, 2022, the disclosure of which is hereby incorporated by reference herein in its entirety.

BACKGROUND

1. Technical Field

The present disclosure relates to a three-dimensional shaping device and a method of manufacturing a three-dimensional shaped object.

2. Related Art

Concerning a three-dimensional shaping device, for example, in a device described in JP-T-2017-523063 (Patent Literature 1), an existing layer is heated by an energy source connected to a head via an arm section and a following layer is stacked on the heated existing layer to improve adhesion between the existing layer and the following layer.

In the device described in Patent Literature 1, it is necessary to heat a position ahead of a nozzle in order to stack the following layer on the heated existing layer. Therefore, every time a moving direction of the nozzle is changed, it is sometimes necessary to move the energy source to a position where the position ahead of the nozzle can be heated. Therefore, control is sometimes complicated.

SUMMARY

According to a first aspect of the present disclosure, a three-dimensional shaping device is provided. The three-dimensional shaping device includes: a plasticizing unit configured to plasticize a material to generate a plasticized material; a nozzle configured to discharge the plasticized material; a stage including a shaping surface on which the plasticized material is stacked; a moving unit configured to change relative positions of the nozzle and the stage; a plate-shaped first heating unit including a heater configured to heat the plasticized material stacked on the stage, a through-hole being formed in the first heating unit; and a first supporting unit configured such that a relative position thereof to the stage changes together with the nozzle, the first supporting unit supporting the first heating unit to thereby dispose the first heating unit in a position opposed to the stage. At a three-dimensional shaped object shaping time, at least a part of the nozzle is located in the through-hole. The first supporting unit includes a posture changing unit configured to allow a change in a posture of the first heating unit. The posture changing unit is configured to be capable of fixing the posture in a state in which a heating surface, which is a surface close to the shaping surface of the first heating unit, and the shaping surface are in contact in parallel.

According to a second aspect of the present disclosure, a method of manufacturing a three-dimensional shaped object is provided. The method of manufacturing the three-dimensional shaped object includes: a disposing step for locating at least a part of a nozzle in a through-hole formed in a first heating unit having a plate shape, configured such that a relative position thereof to a stage changes together with the nozzle, and disposed in a position opposed to the stage; a stacking step for, after the disposing step is completed, while changing relative positions of the nozzle and the stage, discharging a plasticized material generated by plasticizing a material from the nozzle to the stage to thereby stack the plasticized material on a shaping surface of the stage; and a heating step for heating, with the first heating unit, the plasticized material stacked on the stage. Prior to the disposing step, the stacking step, and the heating step, a contact step for bringing a heating surface, which is a surface close to the shaping surface of the first heating unit, and the shaping surface into contact in parallel in a state in which a change in a posture of the first heating unit is allowed by a posture changing unit configured to allow a change in the posture and a fixing step for fixing the posture in a state in which the heating surface and the shaping surface are in contact in parallel are executed.

DESCRIPTION OF EMBODIMENTS

A. First Embodiment

Figure 1:
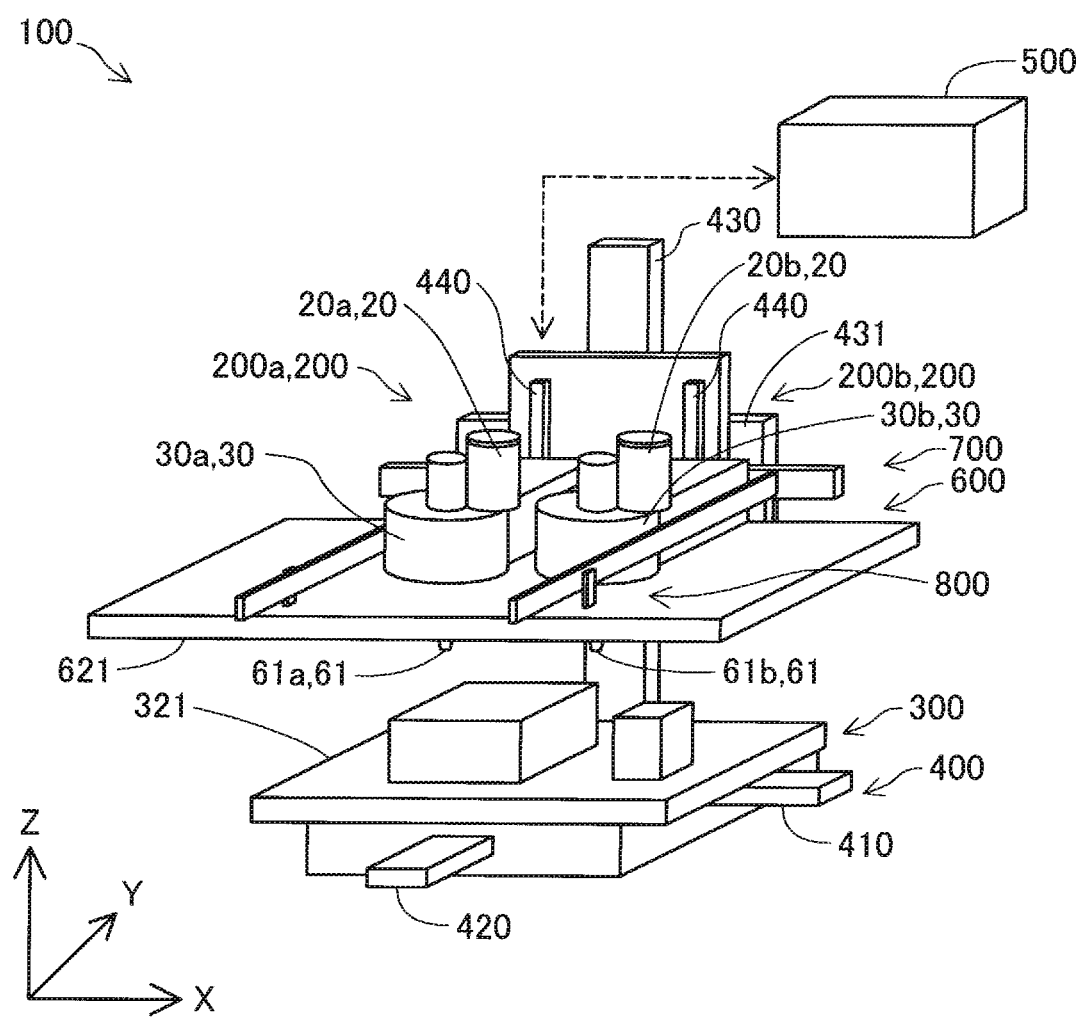
FIG. 1 is a first diagram showing a schematic configuration of a three-dimensional shaping device.
Figure 2:
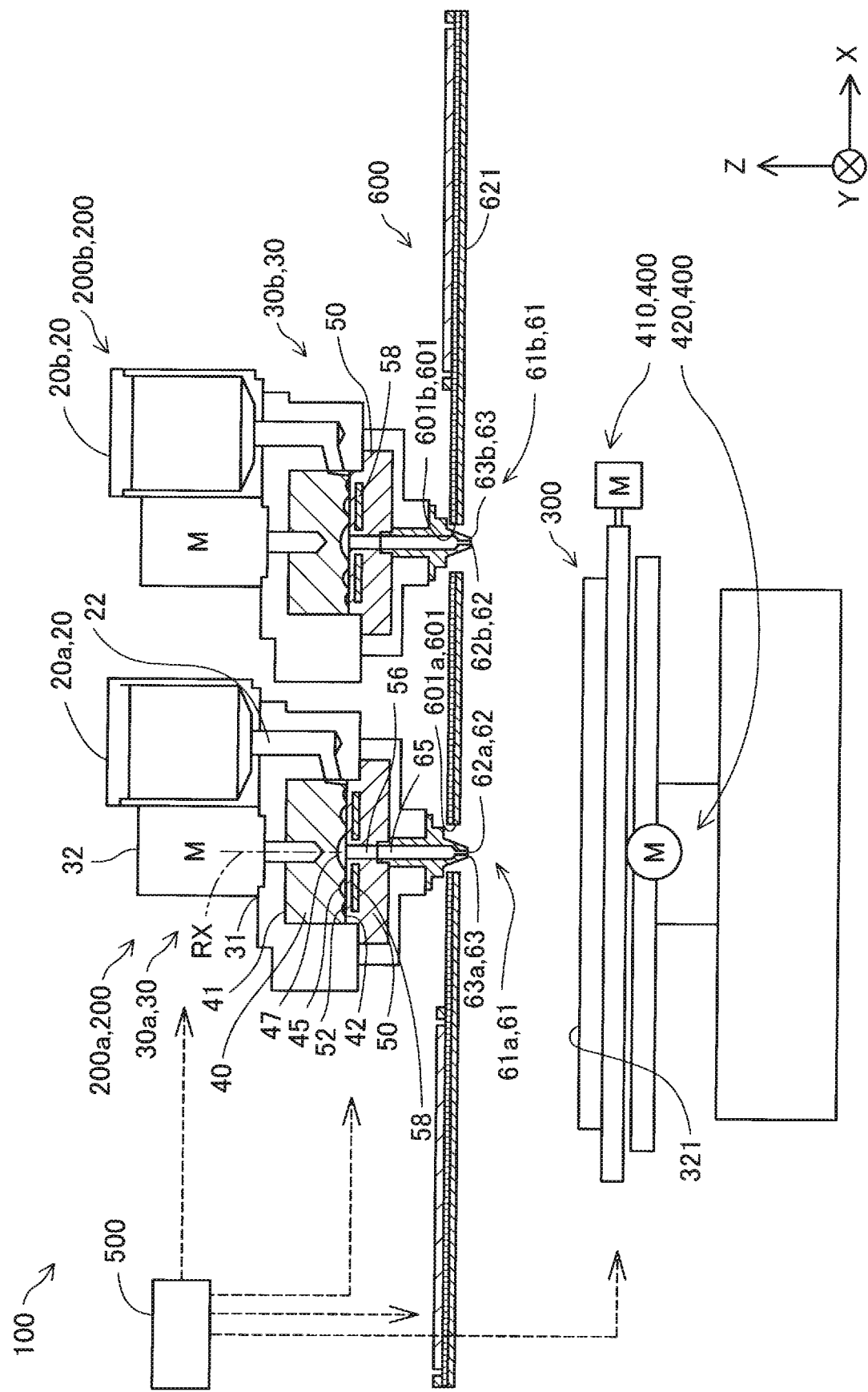
FIG. 2 is a second diagram showing the schematic configuration of the three-dimensional shaping device.

FIG. 1 is a first diagram showing a schematic configuration of a three-dimensional shaping device 100 in a first embodiment. FIG. 2 is a second diagram showing the schematic configuration of the three-dimensional shaping device 100 in the first embodiment. In FIGS. 1 and 2, arrows in X, Y, and Z directions orthogonal to one another are shown. The X, Y, and Z directions are directions extending along an X axis, a Y axis, and a Z axis, which are three spatial axes orthogonal to one another. The X, Y, and Z directions respectively include both of directions on one side extending along the X axis, the Y axis, and the Z axis and the opposite directions of the directions. The X axis and the Y axis are axes extending along the horizontal plane and the Z axis is an axis extending along the vertical line. A −Z direction is the vertical direction and a +Z direction is a direction opposite to the vertical direction. The −Z direction is referred to as "downward" as well and the +Z direction is referred to as "upward" as well. In the other figures, the arrows in the X, Y, and Z directions are shown as appropriate. The X, Y, and Z directions in FIGS. 1 and 2 and the X, Y, and Z directions in the other figures represent the same directions.

The three-dimensional shaping device 100 includes a shaping unit 200, a stage 300, a moving unit 400, a control unit 500, a first heating unit 600, and a first supporting unit 700 including posture changing units 800.

The control unit 500 is a control device that controls an operation of the entire three-dimensional shaping device 100. The control unit 500 is configured by a computer including one or a plurality of processors, a memory, and an input/output interface that receives a signal from and outputs a signal to the outside. The processor executes a program or an instruction read on a main storage, whereby the control unit 500 exerts various functions such as a function of executing shaping processing for shaping a three-dimensional shaped object and a function of executing calibration processing explained below. Note that, instead of being configured by the computer, the control unit 500 may be implemented by a configuration in which a plurality of circuits for realizing at least a part of the functions are combined.

The shaping unit 200 discharges, under control by the control unit 500, a plasticized material obtained by melting a solid state material into a paste form onto a stage 300 for shaping functioning as a base for a three-dimensional shaped object. The shaping unit 200 includes a material supply unit 20, which is a supply source of a material before being transformed into the plasticized material, a plasticizing unit 30 that plasticizes the material to generate the plasticized material, and a nozzle 61 that discharge the generated plasticized material. The shaping unit 200 is referred to as head as well.

The three-dimensional shaping device 100 in this embodiment includes a first shaping unit 200a and a second shaping unit 200b as the shaping unit 200. The first shaping unit 200a includes a first material supply unit 20a as the material supply unit 20, includes a first plasticizing unit 30a as the plasticizing unit 30, and includes a first nozzle 61a as the nozzle 61. The second shaping unit 200b includes a second material supply unit 20b as the material supply unit 20, includes a second plasticizing unit 30b as the plasticizing unit 30, and includes a second nozzle 61b as the nozzle 61. The first shaping unit 200a and the second shaping unit 200b are disposed side by side in the X direction such that a position in the Y direction of the first nozzle 61a and a position in the Y direction of the second nozzle 61b coincide. In this embodiment, the second shaping unit 200b is disposed in a position in a +X direction of the first shaping unit 200a. A configuration of the first shaping unit 200a and a configuration of the second shaping unit 200b are the same. Therefore, in the following explanation, when the first shaping unit 200a and the second shaping unit 200b are not particularly distinguished, the first shaping unit 200a and the second shaping unit 200b are sometimes simply referred to as shaping unit 200. When constituent members of the first shaping unit 200a and the second shaping unit 200b are distinguished, a sign "a" is added to the constituent members of the first shaping unit 200a and a sign "b" is added to the constituent members of the second shaping unit 200b.

A material in a state of pellet, powder, or the like is stored in the material supply unit 20. In this embodiment, ABS resin formed in a pellet form is used as the material. The material supply unit 20 in this embodiment is configured by a hopper. As shown in FIG. 2, a supply path 22 connecting the material supply unit 20 and the plasticizing unit 30 is provided below the material supply unit 20. The material supply unit 20 supplies the material to the plasticizing unit 30 via the supply path 22.

As shown in FIG. 2, the plasticizing unit 30 includes a screw case 31, a driving motor 32, a screw 40, and a barrel 50. The plasticizing unit 30 plasticizes at least a part of the material supplied from the material supply unit 20, generates a paste-like plasticized material having fluidity, and supplies the plasticized material to the nozzle 61. "Plasticizing" is a concept including melting and means changing a solid to a state having fluidity. Specifically, in the case of a material in which glass transition occurs, plasticizing means raising the temperature of the material to the glass transition point or higher. In the case of a material in which glass transition does not occur, plasticizing means raising the temperature of the material to the melting point or higher.

Figure 3:
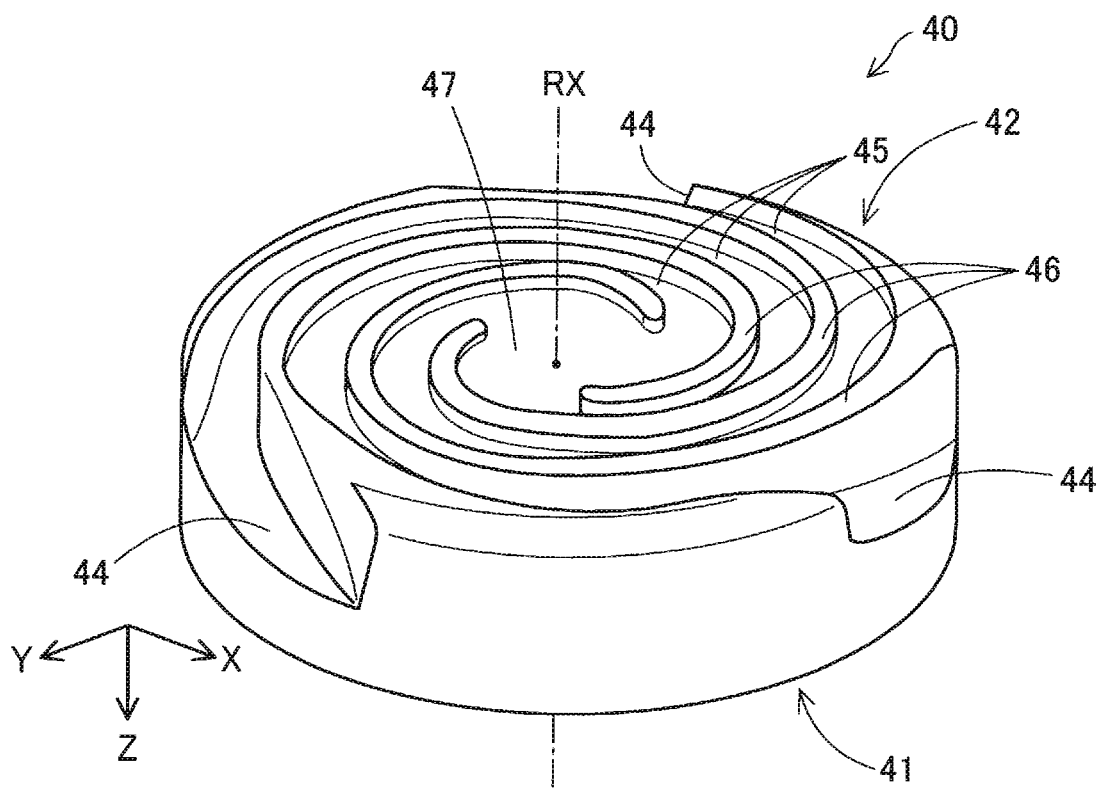
FIG. 3 is a perspective view showing a schematic configuration of a lower surface side of a screw.
Figure 4:
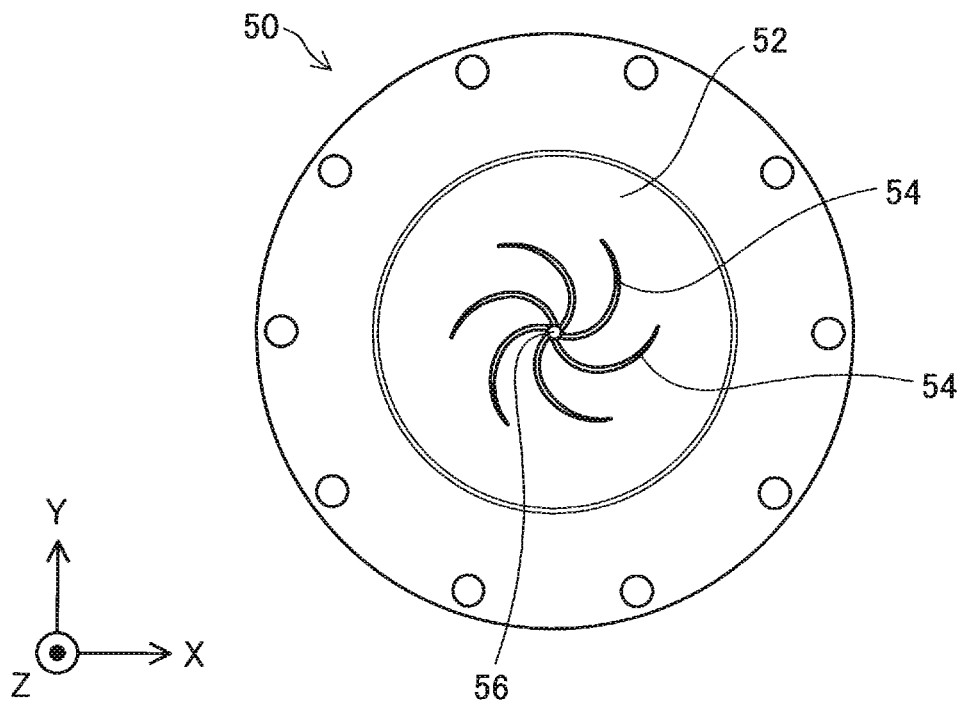
FIG. 4 is a schematic plan view showing an upper surface side of a barrel.

FIG. 3 is a perspective view showing a schematic configuration on a screw lower surface 42 side of the screw 40. FIG. 4 is a schematic plan view showing a barrel upper surface 52 side of the barrel 50. The screw 40 has a substantially columnar shape, the length of which in an axial direction that is a direction along a center axis RX of the screw 40 is smaller than the length of which in a direction orthogonal to the axial direction. The screw 40 is disposed such that the center axis RX, which is a rotation center of the screw 40, is parallel to the Z direction. The screw 40 is called flat screw, rotor, or scroll as well.

As shown in FIG. 2, the screw 40 is housed in the screw case 31. A screw upper surface 41 side of the screw 40 is coupled to the driving motor 32. The screw 40 rotates in the screw case 31 with a rotational driving force generated by the driving motor 32. The driving motor 32 is driven under the control by the control unit 500. Note that the screw 40 may be driven by the driving motor 32 via a speed reducer.

As shown in FIG. 3, spiral grooves 45 are formed on the screw lower surface 42. The supply path 22 of the material supply unit 20 explained above communicates with the grooves 45 from a side surface of the screw 40. The grooves 45 continue to a material introduction port 44 formed in the side surface of the screw 40. The material introduction port 44 is a portion that receives the material supplied via the supply path 22 of the material supply unit 20. As shown in FIG. 3, in this embodiment, three grooves 45 are formed by being partitioned by convex ridge sections 46. Note that the number of grooves 45 is not limited to three and may be one or may be two or more. The grooves 45 are not limited to the spiral shape and may have a helical shape or an involute curve shape or may have a shape extending to draw an arc from a center 47 toward the outer circumference.

As shown in FIG. 2, the barrel 50 is disposed below the screw 40. The barrel upper surface 52 faces the screw lower surface 42. A space is formed between the grooves 45 of the screw lower surface 42 and the barrel upper surface 52. In the barrel 50, a communication hole 56 communicating with a nozzle flow channel 65 of the nozzle 61 explained below is provided on the center axis RX of the screw 40. In the barrel 50, a plasticizing heater 58 is incorporated in a position opposed to the grooves 45 of the screw 40. Temperature of the plasticizing heater 58 is controlled by the control unit 500.

As shown in FIG. 4, a plurality of guide grooves 54 are formed around the communication hole 56 on the barrel upper surface 52. One ends of the respective guide grooves 54 are connected to the communication hole 56. The guide grooves 54 extend in a spiral shape from the communication hole 56 toward the outer circumference of the barrel upper surface 52. The respective guide grooves 54 have a function of guiding the plasticized material to the communication hole 56. Note that the one ends of the guide grooves 54 may not be connected to the communication hole 56. The guide grooves 54 may not be formed in the barrel 50.

The material supplied into the grooves 45 of the screw 40 flows along the grooves 45 according to rotation of the screw 40 while being melted in the grooves 45 and is guided to the center 47 of the screw 40 as the plasticized material. The paste-like plasticized material expressing fluidity, which flowed into the center 47, is supplied to the nozzle 61 via the communication hole 56. Note that not all kinds of substances forming the plasticized material may be melted. At least a part of the kinds of the substances forming the plasticized material are melted, whereby the plasticized material only has to be transformed into a state in which the plasticized material has fluidity as a whole.

As shown in FIG. 2, the nozzle 61 includes a nozzle flow channel 65 and a distal end face 63 in which a nozzle opening 62 is provided. The nozzle flow channel 65 is a flow channel for the plasticized material formed in the nozzle 61 and is connected to the communication hole 56 of the barrel 50 explained above. The distal end face 63 is a surface forming a distal end portion projecting in the −Z direction toward the stage 300. The nozzle opening 62 is a portion, in which a flow channel cross section of the nozzle flow channel 65 is reduced, provided at an end portion on a side of the nozzle flow channel 65 communicating with the atmosphere. A first nozzle opening 62a is formed in a first distal end face 63a of the first nozzle 61a. A second nozzle opening 62b is formed in a second distal end face 63b of the second nozzle 61b. The plasticized material generated by the plasticizing unit 30 is supplied to the nozzle 61 via the communication hole 56 and discharged from the nozzle opening 62 via the nozzle flow channel 65.

The stage 300 is disposed in a position opposed to the nozzle opening 62. The three-dimensional shaping device 100 discharges the plasticized material from the nozzle opening 62 toward a shaping surface 321 of the stage 300 and stacks a layer of the plasticized material on the shaping surface 321 to shape a three-dimensional shaped object. The layer of the plasticized material stacked on the shaping surface 321 is referred to as shaping layer as well. Details of the stage 300 are explained below.

The moving unit 400 changes relative positions of the nozzle 61 and the stage 300. In this embodiment, the moving unit 400 moves the shaping unit 200 in the Z direction, which is a stacking direction, and moves the stage 300 in a direction crossing the stacking direction to thereby change the relative positions of the nozzle 61 and the stage 300. More specifically, the moving unit 400 in this embodiment moves the shaping unit 200 in the Z direction to thereby change relative positions of the nozzle 61 and the stage 300 in the Z direction and moves the stage 300 in the X direction and the Y direction orthogonal to the Z direction to thereby change relative positions of the nozzle 61 and the stage 300 in the X direction and the Y direction. As shown in FIG. 1, the moving unit 400 is configured by a first electric actuator 410 that moves the stage 300 in the X direction, a second electric actuator 420 that moves the stage 300 and the first electric actuator 410 in the Y direction, and a third electric actuator 430 that moves the shaping unit 200 in the Z direction. More specifically, the third electric actuator 430 moves a movable unit 431, to which the first shaping unit 200a and the second shaping unit 200b are fixed, in the Z direction to thereby move the first shaping unit 200a and the second shaping unit 200b in the Z direction. Note that, in FIG. 2, the third electric actuator 430 and the movable unit 431 are omitted.

As shown in FIG. 1, the first supporting unit 700 is further fixed to the movable unit 431. The first supporting unit 700 supports the first heating unit 600 to thereby dispose the first heating unit 600 in a position opposed to the stage 300. Therefore, the third electric actuator 430 in this embodiment moves the first supporting unit 700 in the Z direction together with the shaping unit 200 in a state in which a positional relation between the shaping unit 200 and the first supporting unit 700 is maintained. In other words, it can be said that the first supporting unit 700 is configured such that a relative position thereof to the stage 300 changes together with the nozzle 61. Similarly, it can be said that the first heating unit 600 supported by the first supporting unit 700 is configured such that a relative position thereof to the stage 300 changes together with the nozzle 61. Note that, in FIG. 2, the first supporting unit 700 is omitted.

The first electric actuator 410 to the third electric actuator 430 explained above are driven under the control by the control unit 500. In other embodiments, for example, the moving unit 400 may move the stage 300 in the Z direction and move the shaping unit 200 in the X direction and the Y direction, may move the stage 300 in the X direction, the Y direction, and the Z direction without moving the shaping unit 200, or may move the shaping unit 200 in the X direction, the Y direction, and the Z direction without moving the stage 300. Note that, in the following explanation, a change in a relative position of the nozzle 61 with respect to the stage 300 is sometimes simply referred to as movement of the nozzle 61. In this embodiment, for example, the stage 300 being moved in the +X direction with respect to the nozzle 61 can be rephrased as the nozzle 61 being moved in a −X direction. Similarly, a change in relative positions of the shaping unit 200, the first heating unit 600, and the first supporting unit 700 with respect to the stage 300 is sometimes simply referred to as movement of the shaping unit 200, the first heating unit 600, and the first supporting unit 700.

Figure 5:
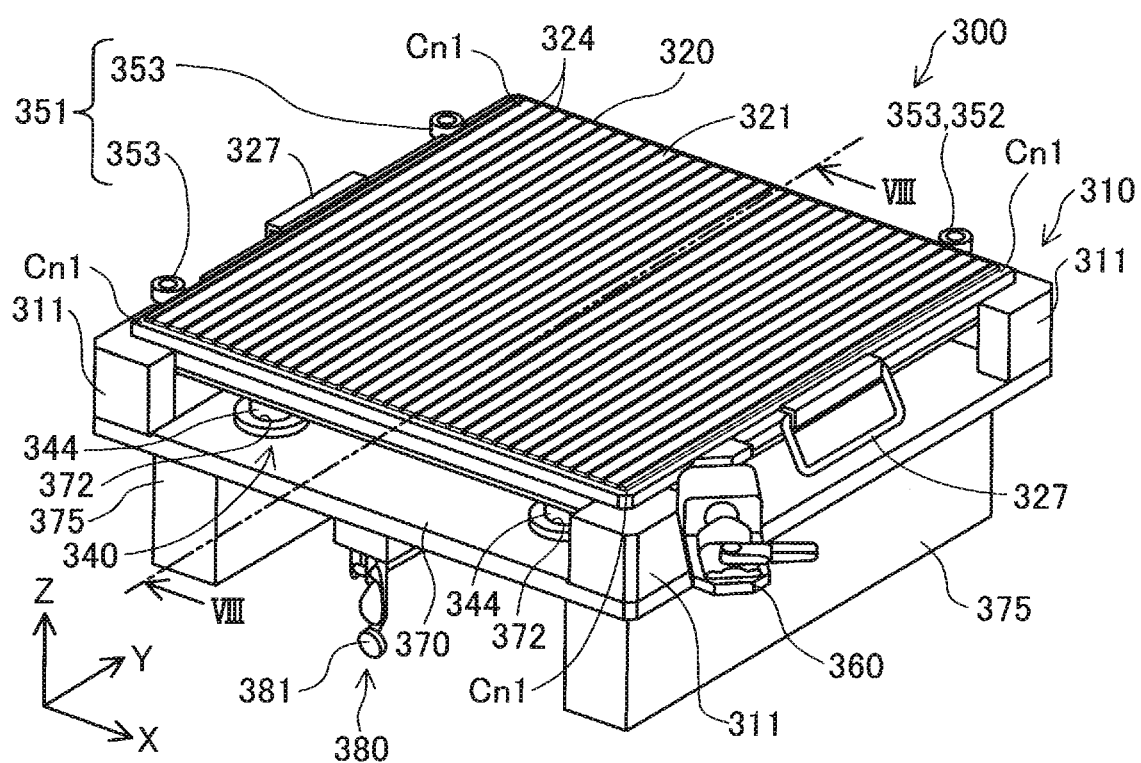
FIG. 5 is a perspective view showing a schematic configuration of a stage.
Figure 6:
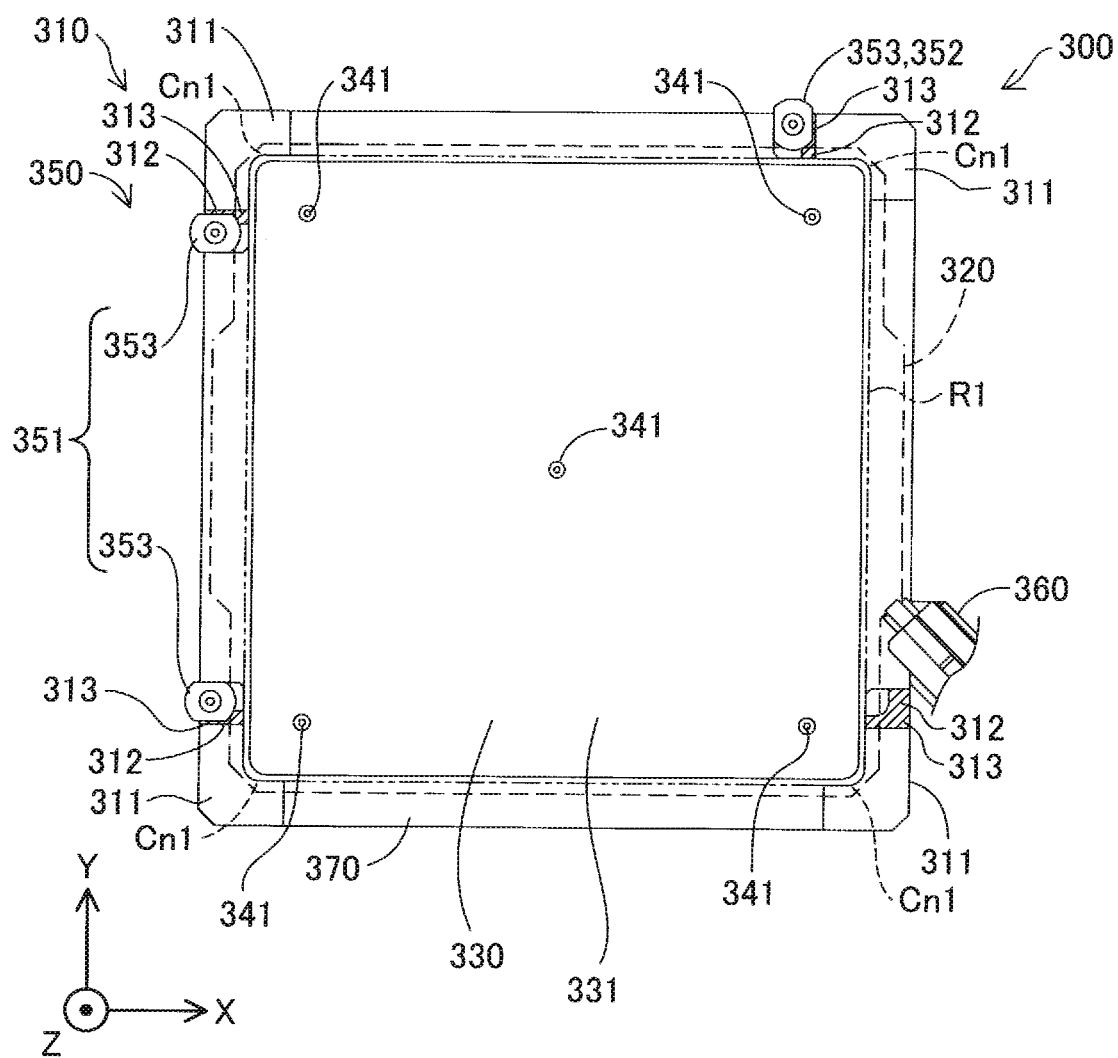
FIG. 6 is a top view of the stage.

FIG. 5 is a perspective view showing a schematic configuration of the stage 300 in this embodiment. FIG. 6 is a top view of the stage 300. As shown in FIGS. 5 and 6, the stage 300 includes a placement unit 310, a shaping stage 320, a second heating unit 330, a pressing unit 340, a holding unit 350, an urging unit 360, a second supporting unit 370, and a pressing and moving unit 380.

The shaping stage 320 is placed on the placement unit 310 as explained below. In this embodiment, the shaping stage 320 is configured to be detachably attachable to the placement unit 310 in the stage 300. The shaping stage 320 in this embodiment is placed on the placement unit 310 and fixed by the holding unit 350 and the urging unit 360 to be attached to the stage 300. For example, a user grips a handle 327 fixed to the shaping stage 320 to hold the shaping stage 320 in the X direction and attaches and detaches the shaping stage 320.

As shown in FIG. 5, the shaping stage 320 includes the shaping surface 321 explained above. The shaping stage 320 in this embodiment includes a plurality of corners Cn1 when viewed in the Z direction perpendicular to the shaping surface 321. More specifically, the shaping stage 320 has a substantially rectangular plate shape and includes four corners Cn1.

In this embodiment, the shaping surface 321 is disposed to be parallel to the X direction and the Y direction as a whole. In this specification, "surface" includes not only a surface configured by only a plane but also a surface that can be grasped as a surface that occupies a fixed region. For example, unevenness may be formed on the surface. For example, a plurality of groves 324 are formed on the shaping surface 321 in this embodiment at a predetermined interval. The grooves 324 are formed to extend in the Y direction. In the other embodiments, the grooves 324 may not be formed on the shaping stage 320.

As shown in FIG. 6, the placement unit 310 is disposed on the outer side of the second heating unit 330 when viewed in the Z direction. The placement unit 310 in this embodiment is configured by four placement members 311. The placement members 311 are disposed to correspond to the corners Cn1 of the shaping stage 320. More specifically, in this embodiment, the placement members 311 have a substantially L shape when viewed in the Z direction and are disposed to partition corners of a substantially rectangular region R1 with walls on the inner side of portions bent in an L shape of the placement members 311. Consequently, the placement members 311 are disposed on the outer side of the second heating unit 330 to surround the second heating unit 330 disposed on the inner side of the region R1 when viewed in the Z direction.

Figure 7:
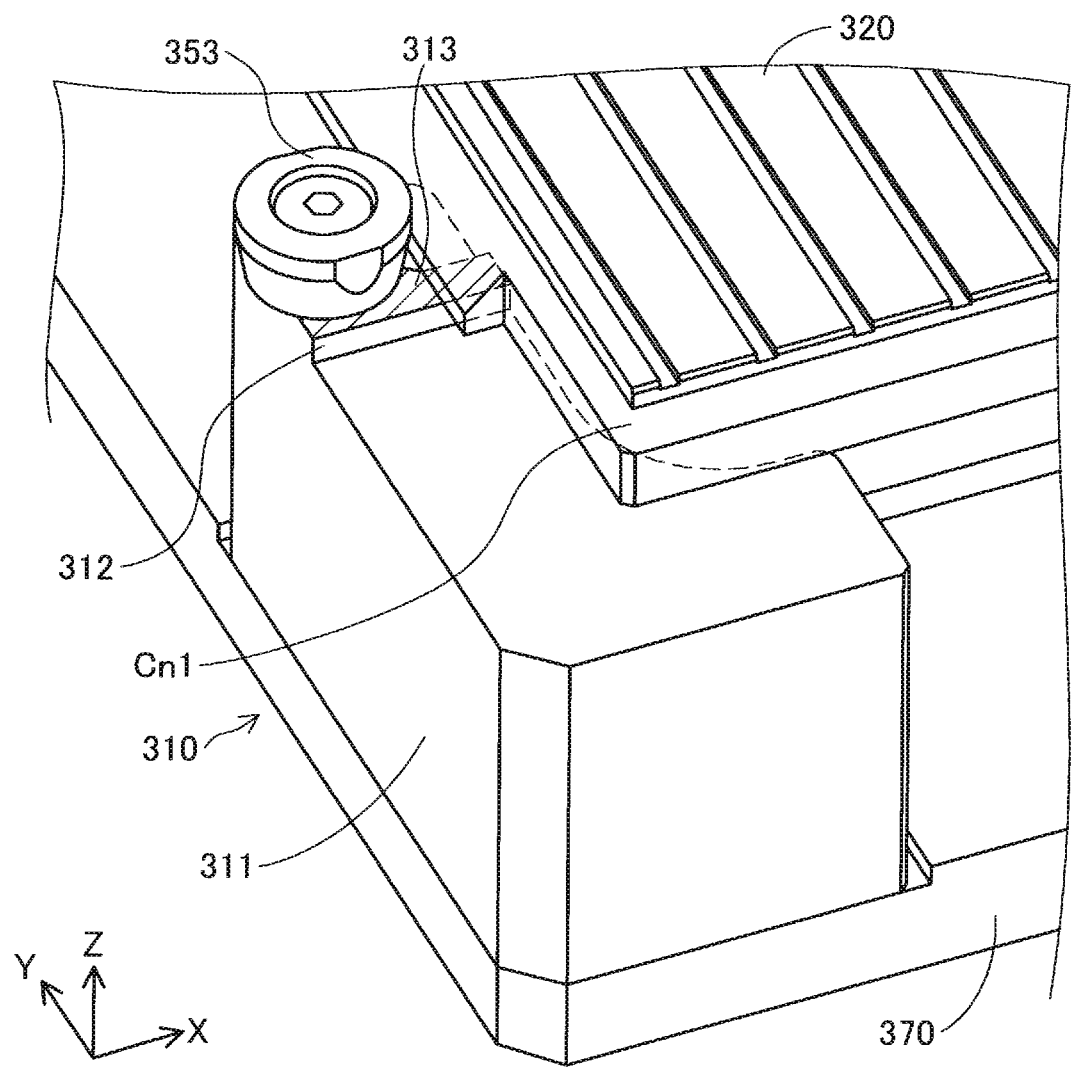
FIG. 7 is a perspective view showing the vicinity of a placement member.

FIG. 7 is a perspective view showing the vicinity of the placement member 311. FIG. 7 enlarges and shows the vicinity of the placement member 311 disposed furthest on the −X-direction side and a −Y-direction side in FIG. 5. In FIG. 7, a portion overlapping the shaping stage 320 in the placement member 311 is indicated by a broken line. As shown in FIGS. 6 and 7, the placement member 311 includes projections 312. The projections 312 are portions further projecting in the +Z direction than portions other than the projections 312 in the placement member 311. The upper surfaces of the projections 312 in this embodiment form reference planes 313, the flatness of which is adjusted. That is, the projections 312 are portions including the reference planes 313 in the placement unit 310. The flatness of the reference planes 313 is preferably, for example, 100 μm or less. In FIGS. 6 and 7, the reference planes 313 is hatched.

As shown in FIG. 6, in this embodiment, the projections 312 are provided in positions corresponding to the corners Cn1 of the shaping stage 320. As shown in FIG. 7, the shaping stage 320 is placed on the reference plane 313 such that the lower surface of the shaping stage 320 is in contact with a part of the reference plane 313 of the projection 312.

In the placement unit 310, portions including the reference planes 313 like the projections 312 in this embodiment are preferably formed by a member having a coefficient of thermal expansion lower than that of the second supporting unit 370. For example, when the second supporting unit 370 is formed by steel or stainless steel, the projections 312 are preferably formed by invar or the like. In this embodiment, the entire placement members 311 are formed by invar. The second supporting unit 370 is formed by steel.

The second supporting unit 370 is provided below the placement unit 310 and the second heating unit 330. The second supporting unit 370 supports the placement unit 310. In this embodiment, the second supporting unit 370 is fixed to the second electric actuator 420 explained above via a pair of legs 375 shown in FIG. 5. The legs 375 have a substantially rectangular parallelepiped shape long in the Y direction and are disposed in the Y direction to face each other in the X direction.

Figure 8:
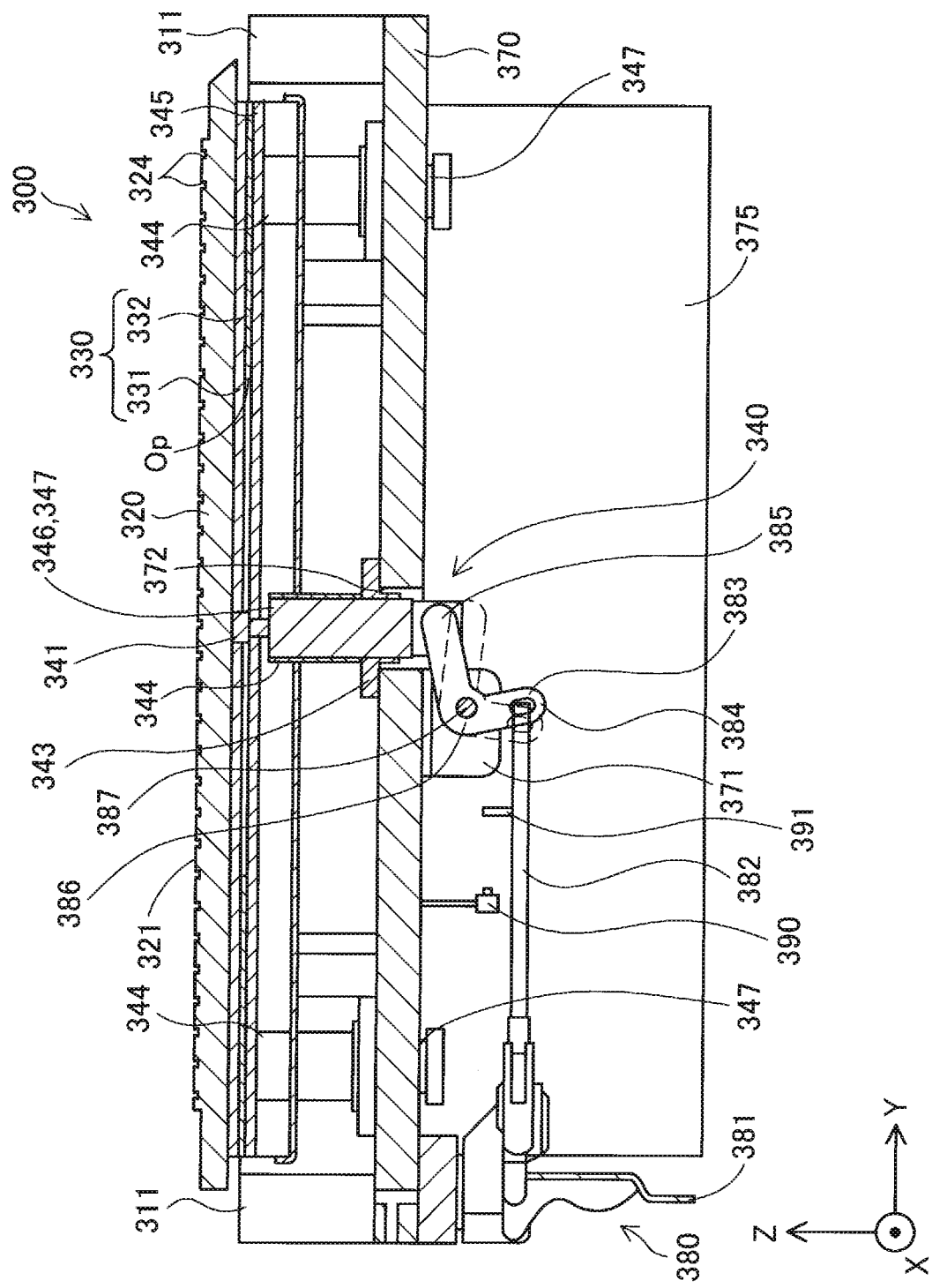
FIG. 8 is a VIII-VIII sectional view of FIG. 5.

FIG. 8 is a VIII-VIII sectional view of FIG. 5. As shown in FIG. 8, the second heating unit 330 is disposed below the shaping stage 320 and disposed further on the inner side than the peripheral edge of the shaping stage 320 when viewed in the Z direction. More specifically, as shown in FIGS. 6 and 8, the second heating unit 330 is disposed in the region R1 explained above when viewed in the Z direction not to be in contact with the placement unit 310. The second heating unit 330 heats the shaping stage 320.

Figure 9:
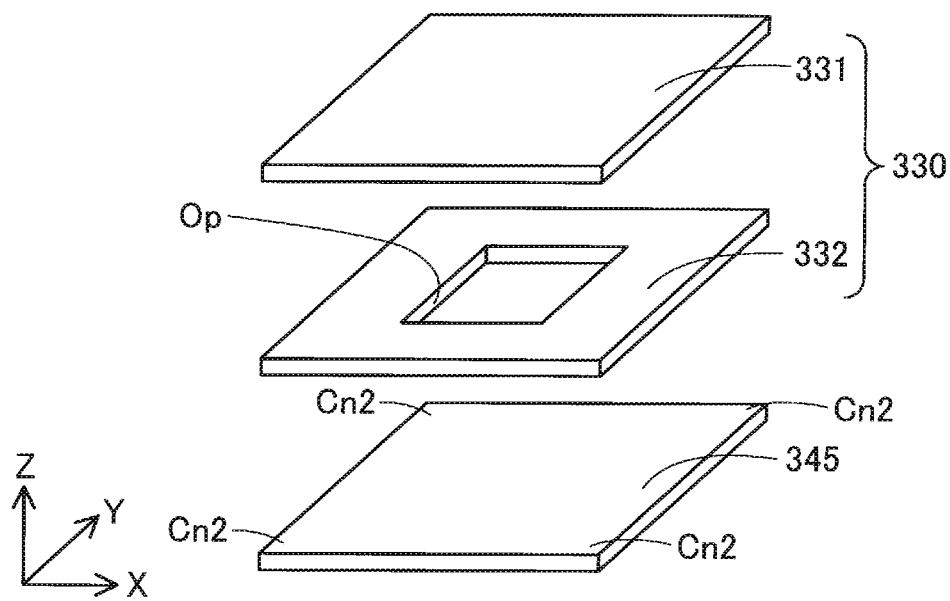
FIG. 9 is an exploded perspective view of a second heating unit.

FIG. 9 is an exploded perspective view of the second heating unit 330. Note that, in FIG. 9, a placement plate 345 explained below is shown. The second heating unit 330 includes a second heating plate 331 and a second heater 332. In this embodiment, the second heater 332 is formed by a rubber heater and has a substantially rectangular plate shape. An opening Op having a substantially rectangular opening shape is formed in the center in the X direction and the Y direction of the second heater 332. The second heater 332 is electrically connected to the control unit 500 via a not-shown wire. The output and the temperature of the second heater 332 are controlled by the control unit 500. In the other embodiments, the second heater 332 may be configured by, for example, a halogen heater, a nichrome wire heater, or a carbon heater. The second heating plate 331 is formed by aluminum and has a substantially rectangular plate shape. The second heating plate 331 is stacked on the second heater 332.

As shown in FIG. 8, the pressing unit 340 is provided below the second heating unit 330. The pressing unit 340 presses the second heating unit 330 against the shaping stage 320 from below. The pressing unit 340 in this embodiment includes a plurality of urging members 344, a placement plate 345, and columns 347.

The placement plate 345 has a plate shape. The second heating unit 330 is placed on the placement plate 345. In this embodiment, the placement plate 345 is formed by aluminum. As shown in FIG. 9, the placement plate 345 in this embodiment has a substantially rectangular plate shape and includes four corners Cn2. As shown in FIG. 8, the columns 347 having a columnar shape extending in the Z direction are coupled to the center in the X direction and the Y direction of the placement plate 345 and positions corresponding to the corners Cn2. The column 347 disposed in the center of the placement plate 345 is particularly referred to as center column 346. The urging members 344 urge the placement plate 345 toward the shaping stage 320. The urging members 344 are provided to correspond to the center and the corners Cn2 of the placement plate 345. In this embodiment, five urging members 344 are provided to correspond to the center and the corners Cn2 of the placement plate 345. More specifically, in this embodiment, the urging members 344 are formed by substantially cylindrical coil springs and are respectively disposed to surround the outer circumferences of the columns 347.

The columns 347 are provided below the placement plate 345. Positioning screws 341 are screwed into screw holes provided on the upper surfaces of the columns 347, whereby the columns 347 are fixed to the placement plate 345. A part of the center column 346 is located on the inside of a hole 372 provided in the second supporting unit 370. A spacer 343 is provided in the hole 372 to fill a gap between the center column 346 and the second supporting unit 370. The urging members 344 are configured as coil springs having a substantially cylindrical shape and provided between the placement plate 345 and the spacer 343 in the outer circumference of the center column 346. The second heating unit 330 is urged in the upward direction by an elastic force of the urging members 344 and pressed against the shaping stage 320 from below. In the following explanation, a state in which the second heating unit 330 is pressed against the shaping stage 320 by the pressing unit 340 is referred to as pressed state as well.

The pressing and moving unit 380 is configured to move the pressing unit 340 in a retracting direction separating from the shaping stage 320 and an advancing direction approaching the shaping stage 320. In this embodiment, the retracting direction is the vertical downward direction. The advancing direction is the vertical upward direction.

The pressing and moving unit 380 in this embodiment includes a first lever 381, a rod 382, a second lever 383, and a detecting unit 390. The rod 382 is formed in a long shaft shape in the axial direction of the rod 382 and disposed in the Y direction. The rod 382 connects the first lever 381 and the second lever 383. The second lever 383 has a substantially L shape when viewed in the X direction and includes one end portion 384 and the other end portion 385 and a bending section 386 connecting the first end portion 384 and the other end portion 385. The second lever 383 is fixed to a fixing member 371 fixed to the lower surface near the center in the X direction and the Y direction of the second supporting unit 370. More specifically, the second lever 383 is fixed to the fixing member 371 by a pin 387, which pierces through the bending section 386 in the X direction, to be capable of turning, with the pin 387 as an axial center, in a YZ plane extending along the Y direction and the Z direction. The end portion in a +Y-direction side of the rod 382 is connected to the one end portion 384 of the second lever 383. The lower end portion of the center column 346 is connected to the other end portion 385.

When the first lever 381 is pulled in the −Y direction, the rod 382 moves in the −Y direction. When the rod 382 moves in the −Y direction, the one end portion 384 of the second lever 383 moves in the −Y direction. The second lever 383 turns in the YZ plane centering on the pin 387. When the second lever 383 turns, the other end portion 385 of the second lever 383 moves in the downward direction and the center column 346 moves in the downward direction. According to the movement in the downward direction of the center column 346, the placement plate 345 fixed to the center column 346 descends while shrinking the urging members 344. In this way, the pressed state is released by the pressing and moving unit 380. Conversely, when the first lever 381 is pushed in the +Y direction in a state in which the pressed state is released, the pressing unit 340 can be raised by the pressing and moving unit 380 and the second heating unit 330 can be pressed against the shaping stage 320. Note that the first lever 381 may be operated by, for example, a hand of the user or may be configured to be operated by, under the control by the control unit 500, a not-shown actuator for causing the first lever 381 to operate.

The detecting unit 390 detects positions in the retracting direction and the advancing direction of the pressing unit 340. In this embodiment, the detecting unit 390 is configured by an optical distance measurement sensor. The detecting unit 390 is fixed to the lower side of the second supporting unit 370. The detecting unit 390 in this embodiment irradiates a marker 391 fixed to the rod 382 with light and receives reflected light of the light to thereby measure the distance in the Y direction between the detecting unit 390 and the marker 391. Since the position in the Y direction of the marker 391 changes according to the movement in the Y direction of the rod 382, the position reflects the position in the Z direction of the pressing unit 340. Therefore, the detecting unit 390 can detect the position in the Z direction of the pressing unit 340 based on the measured distance. In the other embodiments, the detecting unit 390 may be configured by, for example, an ultrasonic or radio wave distance measurement sensor or may be configured by a contact sensor. For example, the detecting unit 390 may directly detect the position in the Z direction of the pressing unit 340 or may detect the position in the Z direction of the pressing unit 340 by detecting the positions, the angles, and the like of the first lever 381, the rod 382, and the second lever 383. The detecting unit 390 only has to detect the position in the Z direction of the pressing unit 340 such that at least the pressed state and the pressing released state can be distinguished.

The holding unit 350 shown in FIG. 5 holds the shaping stage 320 relatively to the reference planes 313. The holding unit 350 includes a first holding unit 351 and a second holding unit 352. The first holding unit 351 is provided at the end portion on the −X-direction side of the placement unit 310. The second holding unit 352 is provided at the end portion on the +Y-direction side of the placement unit 310. The first holding unit 351 and the second holding unit 352 are configured by eccentric pins 353.

Figure 10:
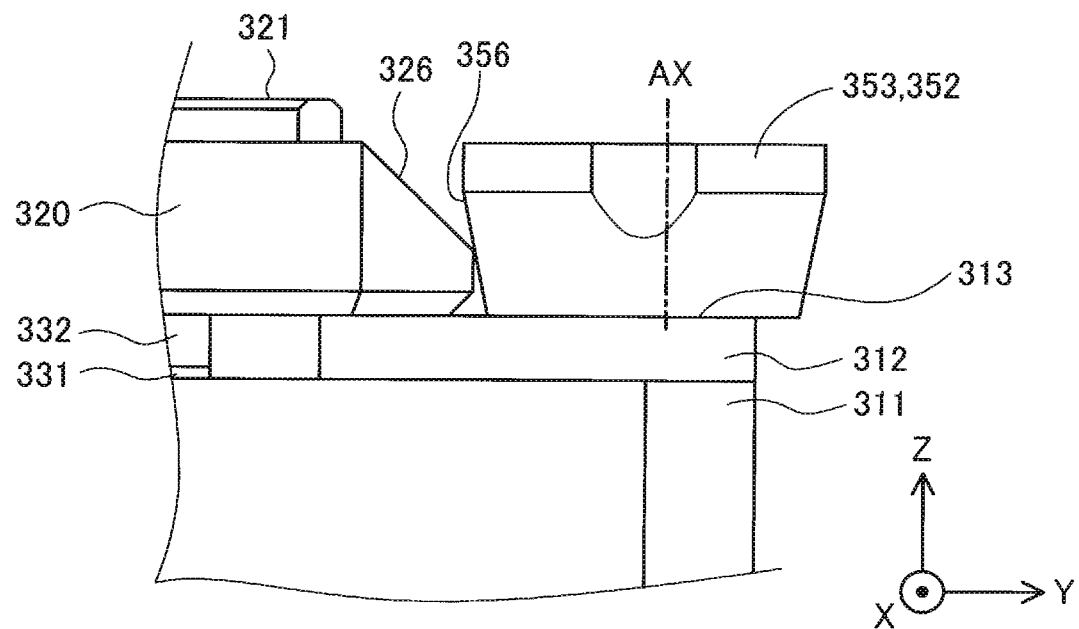
FIG. 10 is a diagram showing a second holding unit and the vicinity of the second holding unit.

FIG. 10 is a diagram showing the second holding unit 352 and the vicinity of the second holding unit 352. A side surface of the shaping stage 320 includes a first inclined surface 326 inclined such that the end portion on the downward side thereof further separates in the horizontal direction from the shaping surface 321 than the end portion on the upward side thereof. More specifically, in this embodiment, side surfaces on the −X-direction side, the +X-direction side, and the +Y-direction side of the shaping stage 320 are configured as the first inclined surface 326. An angle formed by the shaping surface 321 and the first inclined surface 326 is preferably 95° or more and 135° or less on the inner side of the shaping stage 320. In this embodiment, the angle formed by the shaping surface 321 and the first inclined surface 326 is set to 135° on the inner side of the shaping stage 320. The holding unit 350 includes a second inclined surface 356 opposed to the first inclined surface 326 of the shaping stage 320. More specifically, the second inclined surface 356 is inclined such that the end portion on the downward side thereof is located further on the inner side of the eccentric pin 353 than the end portion on the upward side thereof in the horizontal direction. When the second inclined surface 356 comes into contact with the first inclined surface 326, the shaping stage 320 is held relatively to the reference planes 313. As in this embodiment, when the angle formed by the shaping surface 321 and the first inclined surface 326 is 135° on the inner side of the shaping stage 320, an angle of an acute angle formed by the shaping surface 321 and the second inclined surface 356 is preferably 80° or more and less than 90°. Consequently, even when the shaping stage 320 expands because of a temperature rise of the shaping stage 320, it is possible to effectively hold the shaping stage 320 with the holding unit 350 while suppressing a warp of the shaping stage 320.

The eccentric pin 353 has a pin rotation axis AX. The axial direction of the pin rotation axis AX is a direction extending along the Z direction. The pin rotation axis AX is provided in a position deviating from the center of the eccentric pin 353. The eccentric pin 353 is provided to be capable of rotating with the pin rotation axis AX as a rotation axis. The position of the shaping stage 320 in the direction extending along the shaping surface 321 is adjusted by the user rotating the eccentric pin 353 around the pin rotation axis AX. Since the pin rotation axis AX is provided in a position deviating from the center of the eccentric pin 353, the eccentric pin 353 is rotated around the pin rotation axis AX, whereby the distance between the pin rotation axis AX and a portion of the second inclined surface 356 in contact with the first inclined surface 326 changes. Accordingly, the eccentric pin 353 is rotated around the pin rotation axis AX, whereby the position of the shaping stage 320 in the direction extending along the shaping surface 321 changes. The position of the end portion on the −X-direction side of the shaping stage 320 is adjusted by the user rotating the eccentric pin 353 of the first holding unit 351 around the pin rotation axis AX. The position of the end portion on the +Y-direction side of the shaping stage 320 is adjusted by the user rotating the eccentric pin 353 of the second holding unit 352 around the pin rotation axis AX.

The urging unit 360 shown in FIG. 5 urges the shaping stage 320 toward the holding unit 350. The urging unit 360 is provided at the end portion on the +X-direction side of the stage 300. The urging unit 360 includes a not-shown inclined surface opposed to the first inclined surface 326 on the +X-direction side of the shaping stage 320. The urging unit 360 brings the inclined surface into contact with the first inclined surface 326 to urge the shaping stage 320 toward the holding unit 350. Note that the stage 300 may not include the urging unit 360.

Figure 11:
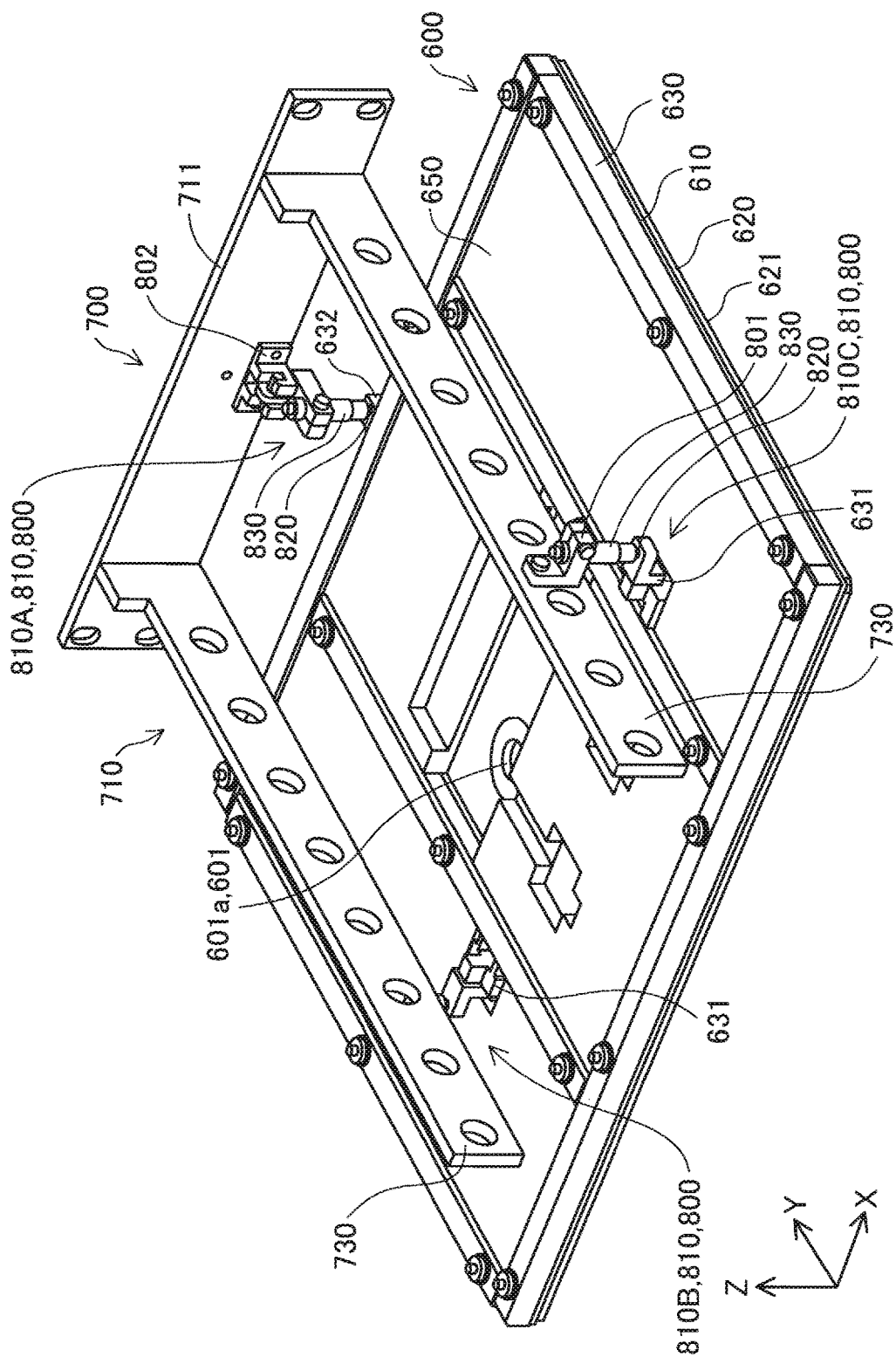
FIG. 11 is a perspective view showing a schematic configuration of a first heating unit and a supporting unit.
Figure 12:
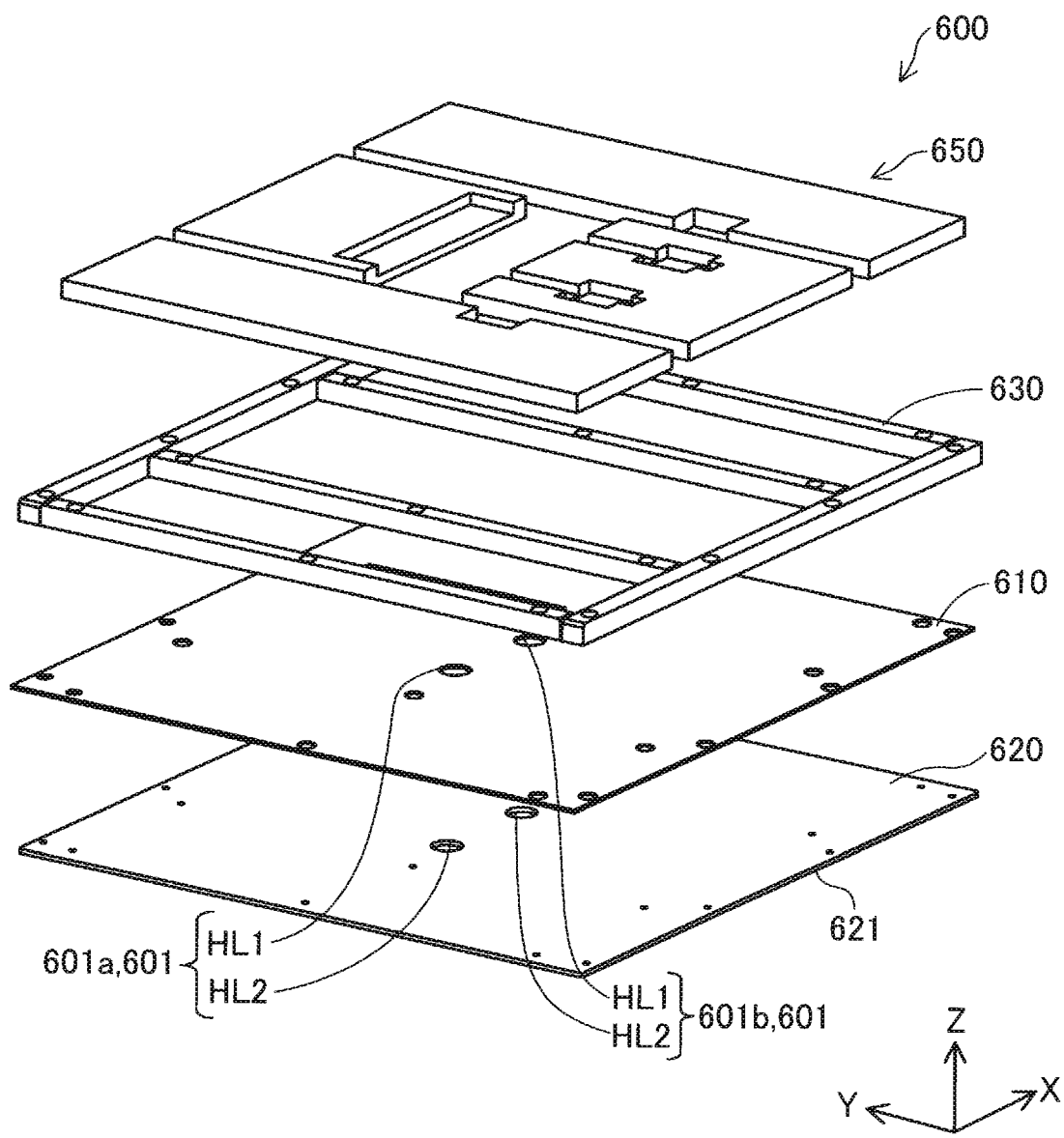
FIG. 12 is an exploded perspective view of the first heating unit.

FIG. 11 is a perspective view showing a schematic configuration of the first heating unit 600 and the first supporting unit 700 in this embodiment. FIG. 12 is an exploded perspective view of the first heating unit 600. As shown in FIGS. 11 and 12, the first heating unit 600 includes a first heater 610, a first heating plate 620 that transmits the heat of the first heater 610 to the plasticized material stacked on the shaping surface 321, a frame unit 630 that supports the first heating plate 620, and a heat insulating unit 650 configured by a heat insulating material. As shown in FIG. 6, the first heating plate 620, the first heater 610, the frame unit 630, and the heat insulating unit 650 are stacked in this order from the bottom.

As shown in FIGS. 2, 11, and 12, through-holes 601 piercing through the first heating unit 600 in a direction orthogonal to a surface direction thereof are formed in the first heating unit 600. In this embodiment, a first through-hole 601a and a second through-hole 601b are formed in the first heating unit 600 as the through-holes 601. The first through-hole 601a and the second through-hole 601b are formed in the center in the Y direction of the first heating unit 600. The second through-hole 601b is formed on the +X-direction side of the first through-hole 601a. In the following explanation, when the first through-hole 601a and the second through-hole 601b are not particularly distinguished, the first through-hole 601a and the second through-hole 601b are simply referred to as through-hole 610 as well. As shown in FIG. 12, in this embodiment, the through-holes 601 are formed by lining up, in the Z direction, a hole HL1 formed to pierce through the first heater 610 in the Z direction and a hole HL2 formed to pierce through the first heating plate 620 in the Z direction.

At least a part of the nozzle 61 is located in the through-hole 601 as shown in FIG. 2 when the plasticized material is discharged to shape a three-dimensional shaped object. In FIG. 2, it can be said that the nozzle 61 is surrounded by the first heating unit 600 when viewed in the Z direction. In the following explanation, "when the plasticized material is discharged to shape a three-dimensional shaped object" is simply referred to as "three-dimensional shaped object shaping time" or "shaping time" as well. In this embodiment, at the three-dimensional shaped object shaping time, the nozzle opening 62 is disposed between a heating surface 621 and the shaping surface 321 in the Z direction. Note that "between the heating surface 621 and the shaping surface 321" does not include the same position as the heating surface 621 and the same position as the shaping surface 321.

The nozzle 61 may not be located in the through-hole 601 at times other than the shaping time. For example, in this embodiment, while tilt adjustment processing explained below is executed, the nozzle 61 is located above the first heating unit 600 and is not located in the through-hole 601. More specifically, in this embodiment, the shaping unit 200 is moved upward with respect to the first heating unit 600 by a fourth electric actuator 440 shown in FIG. 1 under the control by the control unit 500, whereby the nozzle 61 is moved to above the first heating unit 600. The fourth electric actuator 440 moves the shaping unit 200 in the Z direction in this way to thereby switch a state in which the nozzle 61 is located in the through-hole 601 and a state in which the nozzle 61 is located above the first heating unit 600 and, therefore, are not located in the through-hole 601. In the following explanation, moving the nozzle 61 to above the first heating unit 600 is referred to as "retracts the nozzle 61" and "retracts the shaping unit 200" as well. Note that, in the other embodiments, the fourth electric actuator 440 may be configured to, for example, move the first heating unit 600 in the Z direction with respect to the shaping unit 200 to thereby switch the state in which the nozzle 61 is located in the through-hole 601 and the retracted state.

The first heater 610 shown in FIG. 12 is configured by a rubber heater having a rectangular plate shape. The first heater 610 is electrically connected to the control unit 500 via a not-shown wire. The output and the temperature of the first heater 610 are controlled by the control unit 500. In the other embodiments, the first heater 610 may be configured by, for example, a halogen heater, a nichrome wire heater, or a carbon heater.

In this embodiment, the first heating plate 620 has a rectangular plate shape. The lower surface of the first heating plate 620 forms the heating surface 621. The heating surface 621 indicates a surface close to the shaping surface 321 among surfaces of the first heating unit 600. The first heater 610 is directly stuck to the upper surface of the first heating plate 620. The first heating plate 620 supplies the heat supplied from the first heater 610 to the shaping layer via the heating surface 621. In the other embodiments, for example, the first heater 610 may be fixed to the first heating plate 620 via an adhesive or may be fixed to the first heating plate 620 by a fastener such as a bolt.

In this embodiment, the first heating plate 620 is formed by aluminum. Consequently, for example, compared with when the first heating plate 620 is formed by steel or stainless steel, the heat of the first heater 610 can be more efficiently transmitted to the plasticized material by the first heating plate 620 and the first heating plate 620 can be reduced in weight. In the other embodiments, the first heating plate 620 may be formed by, for example, steel or stainless steel.

The first supporting unit 700 includes the posture changing units 800 configured to be capable of allowing a change in a posture of the first heating unit 600. More specifically, the first supporting unit 700 in this embodiment includes a supporting member 710 and hanging units 810 functioning as the posture changing units 800.

The supporting member 710 is fixed such that a relative position thereof to the stage 300 changes together with the nozzle 61. The supporting member 710 in this embodiment includes a fixed plate 711 and a pair of arm sections 730. The fixed plate 711 has a rectangular plate shape long in the X direction and is fixed to the movable unit 431 such that the plate surface thereof extends in the X direction and the Z direction and the longitudinal direction thereof extends in the X direction. The arm sections 730 extend in the −Y direction from the fixed plate 711 and are fixed to the fixed plate 711 to face each other in the X direction.

As shown in FIG. 11, in this embodiment, the first supporting unit 700 includes three hanging units 810. In this embodiment, a first hanging unit 810A hangs and supports the center in the X direction of the end portion in the Y direction of the first heating unit 600. More specifically, the first hanging unit 810A hangs and supports the first heating unit 600 in the −Z direction from the center in the X direction of the fixed plate 711. A second hanging unit 810B and a third hanging unit 810C support a further −Y-direction side than the center position in the Y direction of the first heating unit 600. More specifically, the second hanging unit 810B hangs and supports the first heating unit 600 in the −Z direction from the arm section 730 disposed on the −X-direction side. The third hanging unit 810C hangs and supports the first heating unit 600 in the −Z direction from the arm section 730 disposed on the +X-direction side.

Figure 13:
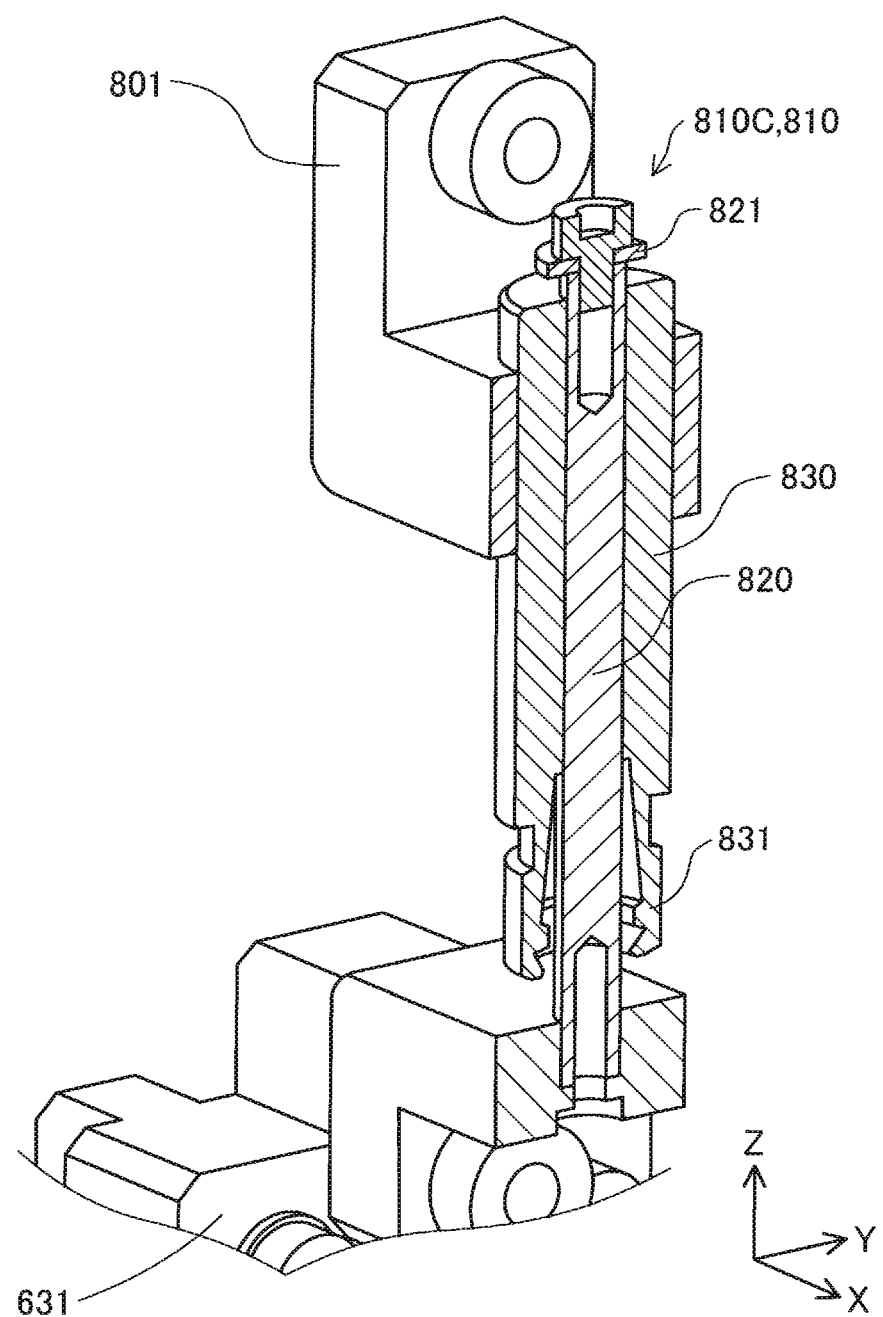
FIG. 13 is a diagram showing a cross section of a hanging unit.

FIG. 13 is a diagram showing a cross section of the hanging unit 810. FIG. 13 shows a cross section of the hanging unit 810C among the three hanging units 810. As explained above, the hanging unit 810 hangs and supports the first heating unit 600 from the supporting member 710. As shown in FIG. 13, the hanging unit 810 includes a movable member 820 and a restricting member 830. The movable member 820 moves in a hanging direction with respect to the supporting member 710 to change the position in the hanging direction of the first heating unit 600. The hanging direction indicates a direction in which the hanging unit 810 hangs the first heating unit 600. The restricting member 830 allows and restricts movement of the movable member 820 in the hanging direction. The restricting member 830 allows the movement of the movable member 820 to thereby allow a change in the posture of the first heating unit 600 and restricts the movement of the movable member 820 to thereby fix the posture of the first heating unit 600.

More specifically, in this embodiment, the movable member 820 is configured as an axial shaft long in the axial direction thereof. The restricting member 830 is configured as an outer diameter gripping-type collet chuck having a substantially cylindrical shape long in the axial direction thereof. The movable member 820 is inserted into the restricting member 830 to pierce through the restricting member 830 in the axial direction of the restricting member 830. A flange unit 821 is provided at the end portion on the upper side of the movable member 820. The movable member 820 is prevented from coming off from the restricting member 830 and a maximum projection amount of the movable member 820 in the downward direction from the restricting member 830 is decided by the flange unit 821. As shown in FIG. 11, the end portions on the lower sides of the movable members 820 of the first hanging unit 810A and the second hanging unit 810B are fixed to the frame unit 630 of the first heating unit 600 via a first fixing member 631. The upper end portions of the restricting members 830 of the first hanging unit 810A and the second hanging unit 810B are fixed to the arm sections 730 via second fixing members 801. The end portion on the lower side of the movable member 820 of the third hanging unit 810C is fixed to the frame unit 630 via a third fixing member 632. The upper end portion of the restricting member 830 of the third hanging unit 810C is fixed to the fixed plate 711 via a fourth fixing member 802.

The restricting member 830 is configured to be capable of gripping the movable member 820 inserted into the restricting member 830 by opening and closing a chuck unit 831. When the chuck unit 831 is opened, the gripping of the movable member 820 is released and the movement of the movable member 820 is allowed. When the chuck unit 831 is closed, the movable member 820 is gripped by the restricting member 830 and the movement of the movable member 820 is restricted. In this embodiment, for example, the chuck unit 831 is configured to be opened and closed by air or hydraulic pressure and is controlled by the control unit 500.

Figure 14:
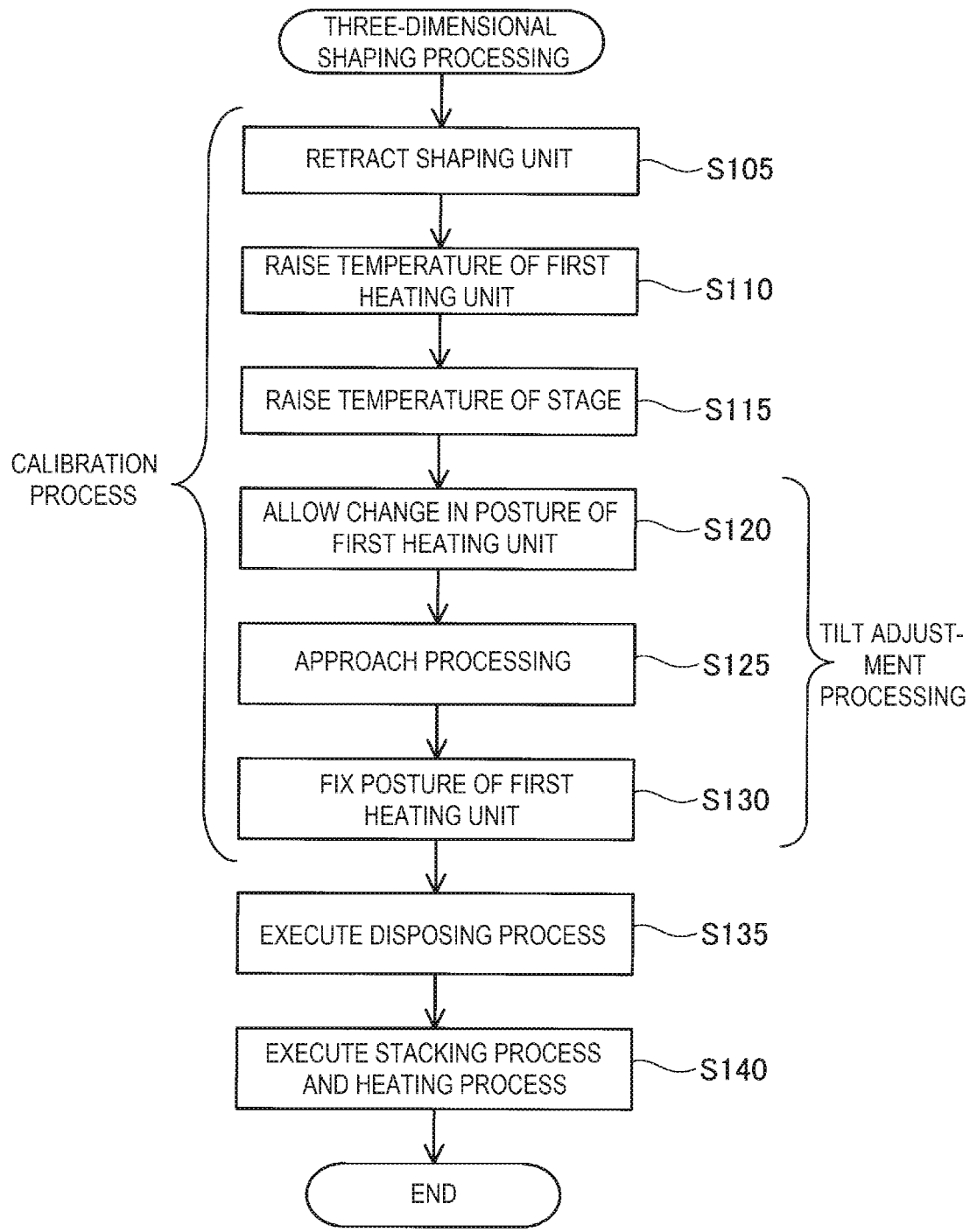
FIG. 14 is a flowchart of three-dimensional shaping processing.

FIG. 14 is a flowchart of three-dimensional shaping processing for realizing a method of manufacturing the three-dimensional shaping device 100 in this embodiment. The three-dimensional shaping processing is executed, for example, when predetermined start operation by the user is performed on the control unit 500 after installation of the stage 300 is completed.

In step S105, the control unit 500 controls the fourth electric actuator 440 to thereby retract the shaping unit 200. More specifically, in step S105, the control unit 500 retracts the first shaping unit 200a and the second shaping unit 200b. Note that the retraction of the shaping unit 200 only has to be executed before the heating surface 621 and the shaping surface 321 come into contact in approaching processing and allowing processing explained below. The three-dimensional shaping processing may be executed after the retraction of the shaping unit 200 is executed. In this case, step S105 may be omitted.

In step S110, the control unit 500 raises the temperature of the first heating unit 600 to a predetermined first temperature. The first temperature is decided as, for example, a setting temperature of the first heating unit 600 at the three-dimensional shaped object shaping time.

In step S115, the control unit 500 raises the temperature of the stage 300 to a predetermined second temperature. In this embodiment, in step S115, the control unit 500 raises the temperature of the shaping stage 320 to the second temperature by controlling the second heating unit 330 and heating the shaping stage 320, for example, while referring to the temperature of the shaping stage 320 detected by a not-shown temperature sensor. For example, a temperature difference between the first temperature and the second temperature is preferable as small as being able to suppress deformation of the shaping surface 321 and the heating surface 621 when the shaping surface 321 and the heating surface 621 come into contact. In this case, the temperature difference is preferably 20° C. or less, more preferably 10° C. or less, and still more preferably 5° C. or less. In this embodiment, the first temperature and the second temperature are the same temperature. Note that, in the other embodiments, step S115 may be executed, for example, prior to step S110. Step S110 and step S115 may be simultaneously executed.

In step S120 to step S130, the control unit 500 executes tilt adjustment processing for adjusting a tilt of the heating surface 621. First, in step S120, the control unit 500 controls the posture changing units 800 to thereby execute allowing processing for allowing a change in a posture of the first heating unit 600. In this embodiment, in step S120, the control unit 500 opens chuck units 831 of the three restricting members 830 to thereby release gripping of movable members 820 by the restricting members 830. Consequently, movement of the movable members 820 in the hanging direction is allowed and the change in the posture of the first heating unit 600 is allowed.

In step S125, the control unit 500 executes approaching processing. The approaching processing indicates processing for controlling the moving unit 400 to thereby bring the heating surface 621 and the shaping surface 321 to close to each other. In this embodiment, in step S120, first, the control unit 500 releases a limit switch concerning approach of the heating surface 621 and the shaping surface 321. The limit switch is set, for the purpose of suppressing contact of the heating surface 621 and the shaping surface 321 during the shaping, in order to prevent the heating surface 621 and the shaping surface 321 from excessively approaching. Note that the limit switch may be a so-called soft limit switch or may be a limit switch implemented by a contact sensor or a noncontact sensor. Subsequently, the control unit 500 controls the moving unit 400 to thereby lower the heating surface 621 until the heating surface 621 and the shaping surface 321 come into contact in parallel. More specifically, for example, at a start point in time in step S120, when the heating surface 621 and the shaping surface 321 are not parallel, first, the heating surface 621 and the shaping surface 321 partially come into contact according to the lowering of the heating surface 621. Since the change in the posture of the first heating unit 600 is allowed in step S115, when the heating surface 621 further lowers in this state, the heating surface 621 and the shaping surface 321 come into contact in parallel. Note that, in this specification, "the heating surface 621 and the shaping surface 321 are parallel" includes not only a case in which the two surfaces are completely parallel but also a case in which an angle difference between the heating surface 621 and the shaping surface 321 is 5° or less.

In the following explanation, a process for bringing the heating surface 621 and the shaping surface 321 into contact in parallel in the state in which the change in the posture of the first heating unit 600 is allowed as in step S120 and step S125 is referred to as contact process as well. That is, the contact process in this embodiment is implemented by the allowing processing and the contact processing explained above. A state in which the heating surface 621 and the shaping surface 321 are in contact in parallel is referred to as parallel contact state as well.

In step S130, the control unit 500 fixes the posture of the first heating unit 600 by controlling the posture changing units 800 while maintaining the parallel contact state realized in step S125. In this embodiment, in step S130, the control unit 500 closes the chuck units 831 of the restricting members 830 to thereby restrict the movement of the movable members 820. Consequently, the change in the posture of the posture changing units 800 is restricted and the posture of the posture changing units 800 is fixed. More specifically, for example, after step S130, even if the heating surface 621 and the shaping surface 321 are separated by the moving unit 400, the posture of the first heating unit 600 is maintained in the same posture as the posture in the parallel contact state. A process for fixing the posture of the first heating unit 600 in the parallel contact state as in step S130 is referred to as fixing process as well. A process for adjusting the posture of the first heating unit 600 prior to a disposing process, a stacking process, and a heating process explained below as in step S105 to step S130 is referred to as calibration process as well. Processing for executing the calibration process is referred to as calibration processing as well.

In step S135, the control unit 500 controls the fourth electric actuator 440 to thereby locate at least a part of the nozzle 61 in the through-hole 601. A process for locating at least a part of the nozzle 61 in the through-hole 601 as in step S135 is referred to as disposing process as well.

In step S140, the control unit 500 executes a stacking process and a heating process. The stacking process is a process for, after the disposing process is completed, stacking the shaping layer on the shaping surface 321 by discharging the plasticized material from the nozzle 61 to the stage 300 while moving the nozzle 61. The heating process indicates a process for heating, with the first heating unit 600, the plasticized material stacked by the staking process. Note that, in this embodiment, after completing step S130, prior to executing step S140, the control unit 500 turns on the limit switch concerning the approach of the heating surface 621 and the shaping surface 321.

With the three-dimensional shaping device 100 in this embodiment explained above, at the three-dimensional shaped object shaping time, at least a part of the nozzle 61 is located in the through-hole 601 of the first heating unit 600 having the plate shape. Consequently, when viewed in the Z direction, the nozzle 61 is surrounded by the first heating unit 600. Therefore, it is possible to heat a shaping material stacked in a position corresponding to the front in a moving direction of the nozzle 61 without moving the first heating unit 600 with respect to the nozzle 61. Therefore, it is possible to, with simple control, heat a layer of the plasticized material stacked in a shaping region, discharge the plasticized material onto the heated layer of the plasticized material, and shape the three-dimensional shaped object. The posture changing units 800 that allow the change in the posture of the first heating unit 600 is configured to be capable of fixing the posture of the first heating unit 600 in a state in which the heating surface 621 and the shaping surface 321 are in contact in parallel. Consequently, for example, compared with when the posture of the first heating unit 600 is adjusted without using the shaping surface 321, it is possible to more easily set the heating surface 621 in parallel to the shaping surface 321. Therefore, it is possible to effectively suppress fluctuation in a heating temperature of the shaping surface 321 due to contact of the shaping layer and the first heating unit 600 at the shaping time and fluctuation in the distance between the heating surface 621 and the shaping surface 321. Therefore, possibility of being able to more accurately shape the three-dimensional shaped object is increased.

In this embodiment, the first supporting unit 700 includes the hanging units 810 that hang and support the first heating unit 600 from the supporting member 710 and function as the posture changing units 800. The hanging units 810 include the movable members 820 that move in the hanging direction with respect to the supporting member 710 to change the position in the hanging direction of the first heating unit 600 and the restricting members 830 that allow and restrict the movement of the movable members 820. The restricting members 830 allow the movement of the movable members 820 to thereby allow the change in the posture of the first heating unit 600 and restrict the movement of the movable members 820 to thereby fix the posture of the first heating unit 600. Therefore, in a form in which the first heating unit 600 is hung and supported, it is possible to easily set the heating surface 621 in parallel to the shaping surface 321.

In particular, in this embodiment, since the restricting members 830 of the hanging units 810 are configured as collet chucks, compared with when the restricting members 830 are configured as members, for example, rod ends that support the movable members 820 by screwing with the movable members 820, the movable members 820 allowed to move can be more easily moved in the hanging direction. In the other embodiments, for example, the restricting members 830 may be configured as inner diameter gripping-type collet chucks or may be configured by set collars. In these cases, as in this embodiment, the movable members 820 allowed to move can be easily moved in the hanging direction. Note that, in the other embodiments, the hanging units 810 may be configured by, for example, rod ends.

In this embodiment, in the tilt adjustment processing, the control unit 500 brings the heating surface 621 and the shaping surface 321 into contact in parallel by executing the approach processing for bringing the heating surface 621 and the shaping surface 321 close to each other and the processing for allowing the change in the posture of the first heating unit 600. In a state in which the heating surface 621 and the shaping surface 321 are in contact in parallel, the control unit 500 controls the posture changing units 800 to thereby fix the posture of the first heating unit 600. Therefore, by causing the control unit 500 to execute the tilt adjustment processing, it is possible to set the heating surface 621 in parallel to the shaping surface 321.

In this embodiment, the control unit 500 executes the tilt adjustment processing after raising the temperatures of the stage 300 and the first heating unit 600 respectively to the predetermined temperatures. Consequently, for example, by executing the tilt adjustment processing after the temperature of the first heating unit 600 is raised to the setting temperature at the three-dimensional shaped object shaping, in the tilt adjustment processing, it is possible to adjust the tilt of the heating surface 621 taking into account influence due to an actual temperature environment at the shaping time. Since the temperature of the stage 300 is raised, when the heating surface 621 and the shaping surface 321 come into contact, it is possible to prevent the heating surface 621 and the shaping surface 321 from being deformed because the temperature of the shaping surface 321 is too low with respect to the temperature of the heating surface 621.

In this embodiment, the shaping stage 320 including the shaping surface 321 is placed on the reference planes 313, the flatness of which is adjusted, the second heating unit 330 is pressed from below by the pressing unit 340 and held relatively to the reference planes 313 by the holding unit 350. Consequently, since it is unnecessary to place the shaping stage 320 on the second heating unit 330, it is possible to reduce the influence of the flatness of the second heating unit 330 on the flatness of the shaping surface 321. Therefore, possibility of being able to more accurately shape the three-dimensional shaped object is increased. Since the posture of the first heating unit 600 is adjusted using the shaping stage 320 placed on the reference planes 313, the flatness of which is adjusted, it is possible to further increase the flatness of the heating surface 621 of the first heating unit 600.

In this embodiment, in the placement unit 310, the projections 312, which are the portions including the reference planes 313, are formed by the member having the coefficient of thermal expansion lower than the coefficient of thermal expansion of the second supporting unit 370 and provided in the positions corresponding to the corners Cn1 of the shaping stage 320. Consequently, for example, compared with when the projections 312 are formed by a member having a coefficient of thermal expansion equal to or higher than the coefficient of thermal expansion of the member forming the second supporting unit 370, thermal expansion of the projections 312 in the case in which the stage 300 is heated can be suppressed. Therefore, even when the stage 300 is heated, the flatness of the reference planes 313 can be maintained high. Since the projections 312 are provided in the positions corresponding to the corners Cn1, for example, even when the center of gravity of the shaping stage 320 deviates from the center to the end portions in the X direction and the Y direction because the shaping layer is stacked on the shaping surface 321 during the shaping, the shaping stage 320 is prevented from tilting. In particular, in this embodiment, since the projections 312 are provided in the positions corresponding to the four corners Cn1 of the rectangular shaping stage 320, for example, compared with when the projections 312 are provided only in positions corresponding to three corners Cn1, the tilt of the shaping stage 320 during the shaping can be further suppressed.

In this embodiment, the stage 300 includes the pressing and moving unit 380 configured to be capable of moving the pressing unit 340 in the retracting direction and the advancing direction. Therefore, by causing the pressing and moving unit 380 to operate, it is possible to release the pressing of the second heating unit 330 against the shaping stage 320 by the pressing unit 340. Consequently, for example, when the shaping stage 320 is installed on the placement unit 310, if the pressing of the second heating unit 330 against the shaping stage 320 is released, it is possible to prevent the shaping stage 320 from being pushed by the second heating unit 330 while the shaping stage 320 is installed. Therefore, when the shaping stage 320 is shaped, it is possible to easily adjust the position and the angle of the shaping stage 302.

In this embodiment, since the pressing and moving unit 380 includes the rod 382 connecting the first lever 381 and the second lever 383, it is possible to increase flexibility of a disposition position of the first lever 381. Therefore, for example, it is possible to easily dispose the first lever 381 in a position where the first lever 381 is easy to use for the user. Since the first lever 381 and the second lever 383 are connected in the Y direction by the rod 382 as in this embodiment, for example, compared with when the first lever 381 and the second lever 383 are connected in the Z direction by the rod 382, it is possible to reduce an installation space in the vertical direction of the pressing and moving unit 380.

In this embodiment, the stage 300 includes the detecting unit 390 that detects the position in the Z direction of the pressing unit 340. Consequently, the position in the Z direction of the pressing unit 340 can be detected by the detecting unit 390. It is possible to detect, based on the detected position, whether the second heating unit 330 is pressed against the shaping stage 320 by the pressing unit 340. Therefore, for example, the control unit 500 can notify the user, based on a detection result by the detecting unit 390, via a not-shown display unit, speaker, or the like, that the second heating unit 330 is pressed against the shaping stage 320 and the pressing is released. For example, the control unit 500 can notify, based on the detection result by the detecting unit 390, when a start of the shaping of the three-dimensional shaped object is instructed in a state in which the pressing is released, warning to the user via the not-shown display unit, speaker, or the like.

The pressing unit 340 includes the placement plate 345 on which the second heating unit 330 is placed, the center column 346 coupled to the center of the placement plate 345, and the plurality of urging members 344 that are provided to correspond to the corners Cn2 and the center 47 of the placement plate 345 and urge the placement plate 345 toward the shaping stage 320. The pressing and moving unit 380 moves the center column 346 in the retracting direction and the advancing direction to thereby move the pressing unit 340 in the Z direction. Consequently, by moving the center column 346 in the Z direction, it is possible to realize, with a simple operation, the pressing of the second heating unit 330 against the shaping stage 320 by the pressing unit 340 and the release of the pressing.

B. Other Embodiments (B-1) In the embodiment explained above, the first supporting unit 700 includes the hanging units 810. However, the first supporting unit 700 may not include the hanging units 810. For example, the first supporting unit 700 may be configured as a supporting unit that supports the first heating unit 600 in the horizontal direction. In this case, the first supporting unit 700 may be configured to be capable of changing a tilt in the horizontal direction of the first heating unit 600 by, for example, turning the first heating unit 600. In this case, the posture changing units 800 may be configured as, for example, fixtures capable of allowing and restricting the turning of the first heating unit 600.

(B-2) In the embodiment explained above, the control unit 500 executes the tilt adjustment processing. However, the control unit 500 may not execute the tilt adjustment processing. In this case, for example, a part or all of the processes included in the tilt adjustment processing may be implemented by manual work of the user. For example, the allowing process may be implemented by opening the chuck units 831 of the restricting members 830 with the manual work of the user.

(B-3) In the embodiment explained above, the control unit 500 executes the tilt adjustment processing after raising the temperatures of the stage 300 and the first heating unit 600 respectively to the predetermined temperatures. In contrast, the control unit 500 may not raise the temperatures of the stage 300 and the first heating unit 600 before executing the tilt adjustment processing.

(B-4) In the embodiment explained above, the projections 312 of the placement unit 310, that is, the portions including the reference planes 313 are formed by the member having the coefficient of thermal expansion lower than the coefficient of thermal expansion of the second supporting unit 370. However, the projections 312 may not be formed by such a member. For example, the projections 312 may be formed by the same member as the second supporting unit 370. For example, the projections 312 may not be provided in the positions corresponding to the corners Cn1 of the shaping stage 320. For example, the projections 312 may be provided in positions corresponding to a part of the corners Cn1 or may not be provided in the positions corresponding to the corners Cn1.

(B-5) In the embodiment explained above, the stage 300 includes the detecting unit 390. However, the stage 300 may not include the detecting unit 390.

(B-6) In the embodiment explained above, the pressing and moving unit 380 moves the center column 346 in the Z direction to thereby move the pressing unit 340 in the Z direction. In contrast, the pressing and moving unit 380 may not be configured to move the center column 346 in the Z direction and, for example, may be configured to move the placement plate 345 in the Z direction not via the center column 346 or may be configured to move the columns 347 other than the center column 346 in the Z direction.

(B-7) In the embodiment explained above, the stage 300 includes the pressing and moving unit 380. However, the stage 300 may not include the pressing and moving unit 380.

(B-8) The stage 300 only has to be configured as a stage including the shaping surface 321 and may not include the shaping stage 320, the second heating unit 330, the placement unit 310, the pressing unit 340, and the holding unit 350 explained in the embodiment. Note that, for example, in a form in which the second heating unit 330 is not provided in the stage 300, when raising the temperature of the stage 300 prior to the tilt adjustment processing, the control unit 500 may heat the stage 300 with the first heating unit 600 and raise the temperature of the stage 300. When another heater capable of heating the stage 300 is provided, the stage 300 may be heated by the heater. For example, in a form in which the second heating unit 330 is provided, the control unit 500 may also raise the temperature of the stage 300 using the first heating unit 600 and the other heater.

(B-9) In the embodiment explained above, in the calibration processing, the parallel contact state is realized by the approach processing being executed after the allowing processing is executed. In contrast, for example, the parallel contact state may be realized by the allowing processing being executed after the approach processing is executed. In this case, for example, the control unit 500 may execute the allowing processing after causing the first heating unit 600 and the stage 300 to approach according to the approach processing until parts of the heating surface 621 and the shaping surface 321 come into contact or may execute the allowing processing after causing the first heating unit 600 and the stage 300 to approach to a position where the heating surface 621 and the shaping surface 321 can be brought into contact by the movement of the movable member 820. The control unit 500 may realize the parallel contact state by, for example, repeatedly executing the approach processing and the allowing processing.

(B-10) In the embodiment explained above, the plasticizing unit 30 includes the screw 40, which is the flat screw, and the barrel 50. In contrast, the plasticizing unit 30 may not include the flat screw. For example, the plasticizing unit 30 may include an inline screw and rotate the inline screw to thereby plasticize the material and generate the plasticized material. In this case, a barrel is formed in a tubular shape for housing the inline screw and is sometimes called cylinder.

(B-11) In the embodiment explained above, the three-dimensional shaping device 100 includes two nozzles 61. In contrast, the number of nozzles 61 may be one or may be three or more. The three-dimensional shaping device 100 in the embodiment includes the two shaping units 200. However, the number of shaping units 200 may be one or may be three or more. One shaping unit 200 may include a plurality of nozzles 61.

(B-12) In the embodiment explained above, the shaping unit 200 is configured as a head that plasticizes and discharges the material formed in the pellet form. In contrast, the shaping unit 200 may be configured as, for example, a head that plasticizes and discharges a filament-like material.

C. Other Aspects

The present disclosure is not limited to the embodiment explained above and can be realized in various aspects without departing from the gist of the present disclosure. For example, the present disclosure can also be realized by the following aspects. Technical features in the embodiment corresponding to technical features in the aspects described below can be substituted and combined as appropriate in order to solve a part or all of the problems of the present disclosure or in order to achieve a part or all of the effects of the present disclosure. Unless the technical features are explained as essential technical features in this specification, the technical features can be deleted as appropriate.

(1) According to a first aspect of the present disclosure, a three-dimensional shaping device is provided. The three-dimensional shaping device includes: a plasticizing unit configured to plasticize a material to generate a plasticized material; a nozzle configured to discharge the plasticized material; a stage including a shaping surface on which the plasticized material is stacked; a moving unit configured to change relative positions of the nozzle and the stage; a plate-shaped first heating unit including a heater configured to heat the plasticized material stacked on the stage, a through-hole being formed in the first heating unit; and a first supporting unit configured such that a relative position thereof to the stage changes together with the nozzle, the first supporting unit supporting the first heating unit to thereby dispose the first heating unit in a position opposed to the stage. At a three-dimensional shaped object shaping time, at least a part of the nozzle is located in the through-hole. The first supporting unit includes a posture changing unit configured to allow a change in a posture of the first heating unit. The posture changing unit is configured to be capable of fixing the posture in a state in which a heating surface, which is a surface close to the shaping surface of the first heating unit, and the shaping surface are in contact in parallel.

According to such an aspect, at the three-dimensional shaped object shaping time, since at least a part of the nozzle is located in the through-hole of the plate-shaped first heating unit, it is possible to heat the shaping material stacked in a position corresponding to the front in a moving direction of the nozzle without moving the first heating unit with respect to the nozzle. Therefore, it is possible to, with simple control, heat a layer of the plasticized material stacked in a shaping region and discharge the plasticized material onto the heated layer of the plasticized material to shape the three-dimensional shaped object. Since the posture of the first heating unit can be adjusted and fixed in the state in which the heating surface and the shaping surface are in contact in parallel, it is possible to easily set the heating surface in parallel to the shaping surface. Therefore, it is possible to effectively suppress fluctuation in a heating temperature of a shaping layer due to contact of the shaping layer and the first heating unit at the shaping time and fluctuation in the distance between the heating surface and the shaping surface. Therefore, possibility of being able to more accurately shape the three-dimensional shaped object is increased.

(2) In the aspect explained above, the first supporting unit may include: a supporting member fixed such that a relative position thereof to the stage changes together with the nozzle; and a hanging unit configured to hang the first heating unit from the supporting member and function as the posture changing unit, the hanging unit may include: a movable member configured to move in a hanging direction with respect to the supporting member to change a position of the first heating unit in the hanging direction; and a restricting member configured to allow and restrict the movement of the movable member, and the restricting member may allow the movement of the movable member to thereby allow the change in the posture and restrict the movement of the movable member to thereby fix the posture. According to such an aspect, in a form in which the first heating unit is hung and supported, it is possible to easily set the heating surface in parallel to the shaping surface.

(3) In the aspect explained above, the three-dimensional shaping device may include a control unit configured to control the moving unit and the posture changing unit, the control unit may execute tilt adjustment processing for adjusting a tilt of the heating surface, and, in the tilt adjustment processing, the control unit may bring the heating surface and the shaping surface into contact in parallel by executing processing for controlling the moving unit to thereby cause the heating surface and the shaping surface to approach and processing for controlling the posture changing unit to thereby allow the change in the posture and may fix the posture by controlling the posture changing unit in a state in which the heating surface and the shaping surface are in contact in parallel. According to such as aspect, it is possible to set the heating surface in parallel to the shaping surface by causing the control unit to execute the tilt adjustment processing.

(4) In the aspect explained above, the control unit may execute the tilt adjustment processing after raising temperatures of the stage and the first heating unit respectively to predetermined temperatures. According to such an aspect, for example, by executing the tilt adjustment processing after raising the temperature of the first heating unit to a setting temperature at the three-dimensional shaped object shaping time, in the tilt adjustment processing, it is possible to adjust the tilt of the heating surface taking into account influence due to an actual temperature environment at the shaping time. Since the temperature of the stage is raised, when the heating surface and the shaping surface come into contact, it is possible to prevent the heating surface and the shaping surface from being deformed because the temperature of the shaping surface is too low with respect to the temperature of the heating surface.

(5) In the aspect explained above, the stage may include: a shaping stage placed on reference planes, flatness of which is adjusted, and including the shaping surface; a second heating unit disposed below the shaping stage and configured to heat the shaping stage; a placement unit including the reference planes and disposed on an outer side of the second heating unit when viewed in a direction perpendicular to the shaping surface; a pressing unit configured to press the second heating unit against the shaping stage; and a holding unit configured to hold the shaping stage relatively to the reference planes. According to such an aspect, since it is unnecessary to place the shaping stage on the second heating unit, it is possible to reduce influence of the flatness of the second heating unit on the flatness of the shaping surface. Therefore, possibility of being able to more accurately shape the three-dimensional shaped object is increased.

(6) In the aspect explained above, the stage may include a second supporting unit configured to support the placement unit, the shaping stage may include a plurality of corners when viewed in a direction perpendicular to the shaping surface, and portions including the reference planes of the placement unit may be formed by a member having a coefficient of expansion lower than a coefficient of expansion of the second supporting unit and may be provided in positions corresponding to the corners of the shaping stage. According to such an aspect, for example, compared with when the portions including the reference planes are formed by a member having a coefficient of thermal expansion equal to or higher than the coefficient of thermal expansion of the member forming the second supporting unit, it is possible to further suppress thermal expansion of the portions including the reference planes when the stage is heated. Therefore, it is possible to maintain the flatness of the reference planes high even when the stage is heated. Since the portions including the reference planes are provided in the positions corresponding to the corners of the shaping stage, it is possible to further suppress the tilt of the shaping stage during the shaping of the three-dimensional shaped object.

(7) In the aspect explained above, the stage may include a pressing and moving unit configured to move the pressing unit in a retracting direction separating from the shaping stage and an advancing direction approaching the shaping stage. According to such an aspect, by causing the pressing and moving unit to operate, it is possible to release the pressing of the second heating unit against the shaping stage by the pressing unit.

(8) In the aspect explained above, the stage may include a detecting unit configured to detect positions of the pressing unit in directions extending along the retracting direction and the advancing direction. According to such an aspect, the positions of the pressing unit in the directions extending along the retracting direction and the advancing direction can be detected by the detecting unit. It is possible to detect, based on the detected positions, whether the second heating unit is pressed against the shaping stage by the pressing unit.

(9) In the aspect explained above, the pressing unit may include: a placement plate on which the second heating unit is placed, the placement plate including corners; a center column coupled to a center of the placement plate; and a plurality of urging members provided to correspond to the corners of the placement plate and the center of the placement plate and configured to urge the placement plate toward the shaping stage, and the pressing and moving unit may move the pressing unit by moving the center column in the retracting direction and the advancing direction. According to such an aspect, by moving the center column in the directions extending along the retracting direction and the advancing direction, it is possible to realize, with a simple operation, the pressing of the second heating unit against the shaping stage by the pressing unit and the release of the pressing.

(10) According to a second aspect of the present disclosure, a method of manufacturing a three-dimensional shaped object is provided. The method of manufacturing the three-dimensional shaped object includes: a disposing step for locating at least a part of a nozzle in a through-hole formed in a first heating unit having a plate shape, configured such that a relative position thereof to a stage changes together with the nozzle, and disposed in a position opposed to the stage; a stacking step for, after the disposing step is completed, while changing relative positions of the nozzle and the stage, discharging a plasticized material generated by plasticizing a material from the nozzle to the stage to thereby stack the plasticized material on a shaping surface of the stage; and a heating step for heating, with the first heating unit, the plasticized material stacked on the stage. Prior to the disposing step, the stacking step, and the heating step, a contact step for bringing a heating surface, which is a surface close to the shaping surface of the first heating unit, and the shaping surface into contact in parallel in a state in which a change in a posture of the first heating unit is allowed by a posture changing unit configured to allow a change in the posture and a fixing step for fixing the posture in a state in which the heating surface and the shaping surface are in contact in parallel are executed.

What is claimed is:

1. A three-dimensional shaping device comprising:
a plasticizing unit configured to plasticize a material to generate a plasticized material;
a nozzle configured to discharge the plasticized material;
a stage including a shaping surface on which the plasticized material is stacked;
a moving unit configured to change relative positions of the nozzle and the stage;
a plate-shaped first heating unit including a heater configured to heat the plasticized material stacked on the stage, a through-hole being formed in the first heating unit; and
a first supporting unit configured such that a relative position thereof to the stage changes together with the nozzle, the first supporting unit supporting the first heating unit to thereby dispose the first heating unit in a position opposed to the stage, wherein
at a three-dimensional shaped object shaping time, at least a part of the nozzle is located in the through-hole,
the first supporting unit includes a posture changing unit configured to allow a change in a posture of the first heating unit, and
the posture changing unit is configured to be capable of fixing the posture in a state in which a heating surface, which is a surface close to the shaping surface of the first heating unit, and the shaping surface are in contact in parallel.

2. The three-dimensional shaping device according to claim 1, wherein
the first supporting unit includes:
a supporting member fixed such that a relative position thereof to the stage changes together with the nozzle; and
a hanging unit configured to hang the first heating unit from the supporting member and function as the posture changing unit,
the hanging unit includes:
a movable member configured to move in a hanging direction with respect to the supporting member to change a position of the first heating unit in the hanging direction; and
a restricting member configured to allow and restrict the movement of the movable member, and
the restricting member allows the movement of the movable member to thereby allow the change in the posture and restricts the movement of the movable member to thereby fix the posture.

3. The three-dimensional shaping device according to claim 1, further comprising a control unit configured to control the moving unit and the posture changing unit, wherein the control unit executes tilt adjustment processing for adjusting a tilt of the heating surface, and in the tilt adjustment processing, the control unit brings the heating surface and the shaping surface into contact in parallel by executing processing for controlling the moving unit to thereby cause the heating surface and the shaping surface to approach and processing for controlling the posture changing unit to thereby allow the change in the posture and fixes the posture by controlling the posture changing unit in a state in which the heating surface and the shaping surface are in contact in parallel.

4. The three-dimensional shaping device according to claim 3, wherein the control unit executes the tilt adjustment processing after raising temperatures of the stage and the first heating unit respectively to predetermined temperatures.

5. The three-dimensional shaping device according to claim 1, wherein the stage includes:

a shaping stage placed on reference planes, flatness of which is adjusted, and including the shaping surface;

a second heating unit disposed below the shaping stage and configured to heat the shaping stage;

a placement unit including the reference planes and disposed on an outer side of the second heating unit when viewed in a direction perpendicular to the shaping surface;

a pressing unit configured to press the second heating unit against the shaping stage; and a holding unit configured to hold the shaping stage relatively to the reference planes.

6. The three-dimensional shaping device according to claim 5, wherein the stage includes a second supporting unit configured to support the placement unit, the shaping stage includes a plurality of corners when viewed in a direction perpendicular to the shaping surface, and portions including the reference planes of the placement unit are formed by a member having a coefficient of expansion lower than a coefficient of expansion of the second supporting unit and are provided in positions corresponding to the corners of the shaping stage.

7. The three-dimensional shaping device according to claim 5, wherein the stage includes a pressing and moving unit configured to move the pressing unit in a retracting direction separating from the shaping stage and an advancing direction approaching the shaping stage.

8. The three-dimensional shaping device according to claim 7, wherein the stage includes a detecting unit configured to detect positions of the pressing unit in directions extending along the retracting direction and the advancing direction.

9. The three-dimensional shaping device according to claim 7, wherein the pressing unit includes:

a placement plate on which the second heating unit is placed, the placement plate including corners;

a center column coupled to a center of the placement plate; and a plurality of urging members provided to correspond to the corners of the placement plate and the center of the placement plate and configured to urge the placement plate toward the shaping stage, and the pressing and moving unit moves the pressing unit by moving the center column in the retracting direction and the advancing direction.

* * * * *